US012629648B2

(12) United States Patent
Lu et al.

(10) Patent No.: US 12,629,648 B2
(45) Date of Patent: May 19, 2026

(54) SPLIT-TYPE BLADE, FLUID DRIVING DEVICE AND FLUID DRIVING PROPORTIONAL MIXER

(71) Applicant: NINGBO FORWARD FIRE TECHNOLOGY CO., LTD., Ningbo (CN)

(72) Inventors: Zhigang Lu, Shanghai (CN); Xubin Lu, Ningbo (CN)

(73) Assignee: SHANGHAI VISION MECHANICAL JOINT CO., LTD., Shanghai (CN)

( * ) Notice: Subject to any disclaimer, the term of this patent is extended or adjusted under 35 U.S.C. 154(b) by 635 days.

(21) Appl. No.: 18/123,415

(22) Filed: Mar. 20, 2023

(65) Prior Publication Data

US 2023/0226506 A1 Jul. 20, 2023

Related U.S. Application Data

(63) Continuation of application No. PCT/CN2021/110814, filed on Aug. 5, 2021.

(30) Foreign Application Priority Data

Sep. 18, 2020 (CN) ......................... 202010984748.5

(51) Int. Cl.
*B01F 35/00* (2022.01)
*B01F 35/31* (2022.01)
(Continued)

(52) U.S. Cl.
CPC ........ *B01F 35/32015* (2022.01); *B01F 35/31* (2022.01); *B01F 35/831* (2022.01); *F03C 2/304* (2013.01)

(58) Field of Classification Search
CPC ... B01F 35/32015; B01F 35/831; F03C 2/304
See application file for complete search history.

(56) References Cited

U.S. PATENT DOCUMENTS

2017/0030352 A1* 2/2017 Tang ......................... F04C 2/38

FOREIGN PATENT DOCUMENTS

CN 2128979 Y 3/1993
CN 2379622 Y 5/2000
(Continued)

OTHER PUBLICATIONS

CN210422860U to Shan Machine Translation (Year: 2020).*
(Continued)

*Primary Examiner* — Anshu Bhatia
(74) *Attorney, Agent, or Firm* — Che-Yang Chen

(57) ABSTRACT

A split-type blade, a fluid drive device and a fluid drive proportional mixer. The split-type blade is used as a component of the fluid drive device to convert pressure energy of fluid into mechanical energy. The split-type blade comprises: one or more push rods, each push rod being suitable for being arranged on a rotor of the fluid drive device in a radially slidable manner; and two valve plates, the two valve plates being respectively mounted in parallel at two end portions of the push rods, and each valve plate extending outwards along the push rods to form the split-type blade having a running-through push rod structure. In this way, when the split-type blade drives the rotor to rotate under the effect of a fluid, the push rods of each split-type blade slide in a radial direction relative to the rotor.

7 Claims, 15 Drawing Sheets

A-A

B-B

(51) Int. Cl.

| | |
|---|---|
| ***B01F 35/32*** | (2022.01) |
| ***B01F 35/83*** | (2022.01) |
| ***F03C 2/30*** | (2006.01) |

(56) References Cited

FOREIGN PATENT DOCUMENTS

| | | | |
|---|---|---|---|
| CN | 2379623 | Y | 5/2000 |
| CN | 102059062 | A | 5/2011 |
| CN | 202031765 | U | 11/2011 |
| CN | 103075338 | A | 5/2013 |
| CN | 103075339 | A | 5/2013 |
| CN | 104696139 | A | 6/2015 |
| CN | 206477830 | U | 9/2017 |
| CN | 210422860 | U | 4/2020 |
| CN | 111271206 | A | 6/2020 |
| DE | 2938870 | A1 | 4/1981 |
| JP | 2000291576 | A | 10/2000 |
| KR | 20020067438 | A | 8/2002 |
| WO | 2013124968 | A1 | 8/2013 |
| WO | 2020040461 | A1 | 2/2020 |

OTHER PUBLICATIONS

Supplementary European Search Report received in corresponding European patent application No. 21868322.5, dated Apr. 23, 2024, 4 pages.
International Search Report of Corresponding Application PCT/CN2021/110814, mailed Sep. 28, 2021, 4 pages.

* cited by examiner

B-B

C-C

E-E

F-F

K-K

L-L

SPLIT-TYPE BLADE, FLUID DRIVING DEVICE AND FLUID DRIVING PROPORTIONAL MIXER

CROSS-REFERENCE TO RELATED APPLICATIONS

This application is a continuation of PCT application serial no. PCT/CN2021/110814, filed on Aug. 5, 2021, which claims the priority and benefit of Chinese patent application serial no. 202010984748.5, filed on Sep. 18, 2020. The entireties of PCT application serial no. PCT/CN2021/110814 and Chinese patent application serial no. 202010984748.5 are hereby incorporated by reference herein and made a part of this specification.

TECHNICAL FIELD

The present application relates to a field of fluid driving technology and in particular, relates to a split-type blade, a fluid driving device and a fluid driving proportional mixer.

BACKGROUND ART

The fluid driving device, such as a hydraulic motor, serving as an energy conversion device to converse the pressure energy of the fluid into the mechanical energy, is widely used in various fields like industry, agriculture, and fire protection. The hydraulic motor on the current market generally includes a housing, a stator and a rotor, in which the stator is fixedly connected in the housing, and the blade slidable in the radial direction is provided in the rotor. However, the rotor is eccentrically arranged in the chamber of the stator. When the blade drives the rotor to rotate under the effect of the extinguishing water, the blade is slid along the radial direction of the rotor, so that the end surface of the blade directly abuts against the wall of inner chamber the stator.

The current hydraulic motor generally adopts the traditional blade, in which one end of the traditional blade can be slidably inserted in the rotor along the radial direction, so that the other end of the traditional blade is slid to abut against the wall of the inner chamber of the stator under the effect of the centrifugal force. However, the traditional blade is generally adapted to the hydraulic motor with a higher rotation speed. Due to the low rotation speed, the centrifugal force is too small to cause the sliding of the traditional blade, resulting in a relatively large gap between the traditional blade and the stator, so as to lead to a serious leakage that influences the normal operation of the hydraulic motor.

In order to solve the above problem, some of the hydraulic motors are additionally equipped with a spring structure, so that the traditional blade can abut against the inner wall of the rotor by using the elastic force in a low rotation speed. However, the spring structure has a large stroke, so as to result in a relatively large spring compression force. Therefore, the applied force between the traditional blade and the stator is relatively large, causing a serious abrasion between the traditional blade and the stator and a large noise, which may greatly reduce the service life of the hydraulic motor.

Furthermore, some of the hydraulic motors directly remove the traditional blade and adopt the integrated penetrating blade with an integral structure. The integrated penetrating blade is penetrating provided in the rotor, and the integrated penetrating blade can slide along the radial direction of the rotor, so that two end portions of the integrated penetrating blade abut against the inner wall of the stator throughout in any rotation speed, and the integrated penetrating blade is slid on the inner wall of the stator. However, since the integrated penetrating blade is an integration, which is difficult to have a high flatness. The integrated penetrating blade can slidably penetrate the rotor, so that there is a relatively large gap between the integrated penetrating blade and the rotor, causing a serious abrasion between the contacting surfaces thereof, which will lead to a serious leakage problem.

SUMMARY

One of the purposes in the present application is to provide a split-type blade, a fluid driving device and a fluid driving proportional mixer, to reduce the gap between the blade and the rotor, facilitating reducing the fluid leakage of the fluid driving device.

Another purpose in the present application is to provide a split-type blade, a fluid driving device and a fluid driving proportional mixer. In an embodiment of the present application, the split-type driving device adopts a structure of penetrated pushing rod, so as to ensure a low rotation speed of the fluid driving device and a reduced contacting surface and gap between the blade and the rotor, facilitating reducing abrasion and leakage.

Another purpose in the present application is to provide a split-type blade, a fluid driving device and a fluid driving proportional mixer. In an embodiment of the present application, the split-type blade has a relatively high flatness, facilitating reducing the abrasion and noise caused in the operation of the fluid driving device.

Another purpose in the present application is to provide a split-type blade, a fluid driving device and a fluid driving proportional mixer. In an embodiment of the present application, the pushing rod of the split-type blade can be made of metal material, so as to have a high precision, facilitating further reducing the gap between the split-type blade and the rotor and minimizing the leakage.

Another purpose in the present application is to provide a split-type blade, a fluid driving device and a fluid driving proportional mixer. In an embodiment of the present application, the valve plate of the split-type blade can be made of plastic, facilitating reducing the whole weight of the split-type blade, reducing the abrasion of the split-type blade and the stator, and reducing the noise in the operation.

Another purpose in the present application is to provide a split-type blade, a fluid driving device and a fluid driving proportional mixer. In an embodiment of the present application, a reinforced rib is provided on the valve plate of the split-type blade, facilitating improving the strength of the valve plate, so as to prevent the valve plate from being deformed and damaged.

Another purpose in the present application is to provide a split-type blade, a fluid driving device and a fluid driving proportional mixer. In an embodiment of the present application, the reinforced rib of the split-type blade is disposed at a connection portion between the valve plate and the pushing rod, facilitating improving the connection strength and connection stability between the valve plate and the pushing rod.

Another purpose in the present application is to provide a split-type blade, a fluid driving device and a fluid driving proportional mixer. In an embodiment of the present application, the valve plate of the split-type blade has an arc structure with hyperbolic radius, facilitating reducing the leakage and abrasion between the valve plate and the stator.

Another purpose in the present application is to provide a split-type blade, a fluid driving device and a fluid driving proportional mixer. In an embodiment of the present application, the fluid driving device can balance the pressure differential in the radial direction of the valve plate of the split-type blade by using to balance hole provided in the rotor, facilitating reducing the abrasion between the split-type blade and the rotor.

Another purpose in the present application is to provide a split-type blade, a fluid driving device and a fluid driving proportional mixer. In order to realize the above purposes, the present application is not required to adopt expensive materials or complex structure. Therefore, the present application successfully and effectively provides a technical solution, not only providing the simple split-type blade, fluid driving device and fluid driving proportional mixer, but also increasing the utility and reliability of the split-type blade, fluid driving device and fluid driving proportional mixer.

The present application provides a split-type blade serving as the accessory of the fluid driving device for converting the pressure energy of the fluid into the mechanical energy, in order to realize at least one of the above purposes or other purposes and advantages. The split-type blade includes:

one or more pushing rods, in which each of the one or more pushing rods is configured to be slidably disposed in a rotor of the fluid driving device along a radial direction; and two valve plates, in which two valve plates are respectively mounted on two end portions of the pushing rod in parallel, each of two valve plates is extended outwards along the pushing rod to form a split-type blade with a penetrating pushing rod structure, so that when the split-type blade drives the rotor to rotate under the effect of the fluid, each of the pushing rods of the split-type blades slides in the radial direction of the rotor to ensure an outer edge portion of each valve plate abuts against an inner wall of the stator of the fluid driving device throughout.

In an embodiment of the present application, the pushing rod and the valve plate are made of different materials, and a material strength of the pushing rod is larger than a material strength of the valve plate.

In an embodiment of the present application, the pushing rod is made of metal material, and the valve plate is made of nonmetal material.

In an embodiment of the present application, the plurality of the pushing rods are equally disposed at an interval, and two end portions of each pushing rod are respectively connected to inner edge portions of two valve plates.

In an embodiment of the present application, one or more matching grooves are provided in the inner edge portion of the valve plate, in which the end portion of the pushing rod is inserted in the matching groove of the valve plate, to rigidly or flexibly connect the pushing rod to the valve plate.

In an embodiment of the present application, the split-type blade further includes one or more reinforcing elements, in which the reinforcing element is correspondingly disposed on the valve plate at a connection portion with the pushing rod to reinforce the connection strength between the valve plate and the pushing rod.

In an embodiment of the present application, the reinforcing element adopts two reinforced ribs that are symmetrically disposed at the front and rear sides of the matching groove of the valve plate, and each of the two reinforced ribs is extended from the inner edge portion of the valve plate to the outer edge portion of the valve plate.

In an embodiment of the present application, the reinforcing element adopts a reinforced rib that is correspondingly disposed at the front and rear sides of the matching groove of the valve plate, and the reinforced rib is extended from the inner edge portion of the valve plate to the outer edge portion of the valve plate.

In an embodiment of the present application, the matching groove of the valve plate is backwards and eccentrically disposed at the inner edge portion of the valve plate, so that the matching groove is positioned at a connection portion between the inner edge portion of the valve plate and the reinforced rib.

In an embodiment of the present application, a section area of a middle portion of the pushing rod is larger than a section area of the end portion of the pushing rod, and two end portions of the pushing rod are integrated and respectively extended outwards from two ends of the middle portion of the pushing rod along a direction parallel to a center axis of the middle portion.

In an embodiment of the present application, the outer edge portion of the valve plate has an arc end surface, and the arc end surface has a hyperbolic radius arc structure or single radius arc structure.

In an embodiment of the present application, an arc portion with a larger curvature radius of the arc end surface with the hyperbolic radius arc structure has a same curvature radius with a envelope curve of the inner wall of the stator in a negative displacement area.

In an embodiment of the present application, the split-type blade further includes at least two elastic members, in which each of the two elastic members is correspondingly disposed on a middle end surface of the outer edge portion of the valve plate, so that the elastic member is positioned between the valve plate and the stator when the valve plate is positioned in the positive displacement area or the negative displacement area of the stator, playing a sealing role.

In an embodiment of the present application, the pushing rod is flexibly connected to the valve plate by a fastening member or a miniature spring; or the pushing rod is rigidly connected to the valve plate through an interference fit.

According to another aspect of the present application, the present application further provides a fluid driving device, for partly converting the pressure energy of the fluid into the mechanical energy. The fluid driving device includes:

at least one stator, in which an inner chamber is provided in the at least one stator; at least one rotor, in which the at least one rotor is rotatably provided in the corresponding inner chamber of the at least one stator; and at least two split-type blades, in which the at least two split-type blades slidable in a radial direction are mounted in the corresponding rotor; and each of the at least two split-type blades includes: one or more pushing rods, in which each of the one or more pushing rods is configured to be slidably disposed in a rotor of the fluid driving device along a radial direction; and two valve plates, in which two valve plates are respectively mounted on two end portions of the pushing rod in parallel, each of two valve plates is extended outwards along the pushing rod to form a split-type blade with a penetrating pushing rod structure, so that when the split-type blade drives the rotor to rotate under the effect of the fluid, each of the pushing rods of the split-type blades slides in the radial direction of the rotor to ensure an outer edge portion of each valve plate abuts against an inner wall of the stator of the fluid driving device throughout.

In an embodiment of the present application, at least two penetrating through holes are provided in the rotor, in which each of the at least two penetrating through holes is extended along the radial direction of the rotor to penetrate the rotor for being slidably mounted in the split-type blade.

In an embodiment of the present application, each penetrating through hole of the rotor includes one or more sliding holes and two retracting grooves, in which two retracting grooves are symmetrically provided on a periphery of the rotor, the sliding hole is extended from one retracting groove to another retracting groove; the pushing rod of the split-type blade is slidably mounted in the sliding hole of the rotor, and the valve plate is retractable mounted in the retracting groove of the rotor.

In an embodiment of the present application, at least two pairs of sealing grooves are further provided in the rotor, two sealing grooves in each pair of the sealing grooves are respectively disposed on sidewalls of two retracting grooves of the penetrating through hole of the rotor, the sealing grooves are configured to accommodate the sealing member to seal a gap between the valve plate and the rotor by the sealing member.

In an embodiment of the present application, the split-type blade further includes one or more reinforcing elements, in which the reinforcing element is correspondingly disposed on the valve plate at a connection portion with the pushing rod to reinforce the connection strength between the valve plate and the pushing rod, the rotor further includes an eccentric groove backwards extending from the retracting groove or a concentric groove frontwards extending from the retracting groove, for slidably accommodating the reinforcing elements.

In an embodiment of the present application, a plurality of balance holes are provided in the rotor, each of the plurality of balance holes is positioned in the rotor and is communicated with a bottom of the corresponding retracting groove; when the valve plate of the split-type blade slides to an inlet area and an outlet area of the stator, the balance hole corresponding to the valve plate is configured to introduce fluid in the retracting groove to balance the pressure differential of the valve plate along the radial direction.

According to another aspect of the present application, the present application further provides a fluid driving proportional mixer for mixing a first fluid and a second fluid. The fluid driving proportional mixer includes:

a fluid driving device for partly converting the pressure energy of the first fluid in the fluid driving device into the mechanical energy and outputting the first fluid, a pump device for converting the mechanical energy into the pressure energy of the second fluid in operation and outputting the second fluid; and a coupling for transmitting the mechanical energy conversed by the fluid driving device to the pump device to drive the pump device to operate, so that the first fluid outputted by the fluid driving device is mixed with the second fluid outputted by the pump device in a predetermined ratio in which the coupling connects the fluid driving device to the pump device, in which the fluid driving device includes at least one stator, in which an inner chamber is provided in the at least one stator;

at least one rotor, in which the at least one rotor is rotatably provided in the corresponding inner chamber of the at least one stator; and at least two split-type blades, in which the at least two split-type blades slidable in a radial direction are mounted in the corresponding rotor; and each of the at least two split-type blades includes: one or more pushing rods, in which each of the one or more pushing rods is configured to be slidably disposed in a rotor of the fluid driving device along a radial direction; and two valve plates, in which two valve plates are respectively mounted on two end portions of the pushing rod in parallel, each of two valve plates is extended outwards along the pushing rod to form a split-type blade with a penetrating pushing rod structure, so that when the split-type blade drives the rotor to rotate under the effect of the fluid, each of the pushing rods of the split-type blades slides in the radial direction of the rotor to ensure an outer edge portion of each valve plate abuts against an inner wall of the stator of the fluid driving device throughout.

The further purposes and advantages of the present application can be fully described in combination with the explanation of the following description and drawings.

The above and other purposes, features and advantages of the present application are fully described via the following detailed description, drawings and claims.

DETAILED DESCRIPTION

Figure 1:
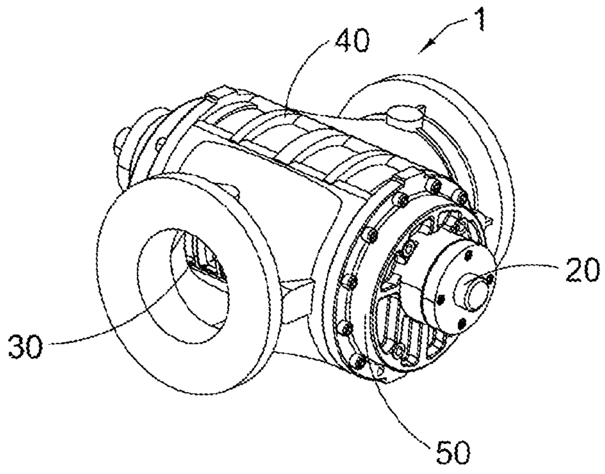
FIG. 1 is a perspective schematic diagram of a fluid driving device according to an embodiment of the present application.

The following description discloses the present application, so that those skilled in the art can realize the present application. The preferred embodiments described below are only examples. It is easy for those skilled in the art to make other obvious transformations. The basic principle of the present application defined in the following description can be applied to other implementation solutions, transformation solutions, improved solutions, equivalent solutions and other technical solutions without deviating from the spirit and scope of the present application.

Those skilled in the art should understand that the terms for indicating the orientations or position relationships such as "longitudinal", "transverse" "above" "below", "front", "rear", "left", "right", "vertical", "horizontal", "top", "bottom", "inner" and "outer" are based on the orientations or position relationships indicated in the drawings, which is intended to facilitate describing and simplify the description, but not intended to indicate or imply that the device or element must has a specific direction, or be constructed and operated in a specific direction. Therefore, the above terms cannot be understood as the limitation of the present application.

In the present application, the term "a" in the claims and specification should be understood as "one or more", that is, the number of the element can be one in an embodiment, and can be more than one in other embodiments. Unless the disclosure of the present application clearly indicates that the number of the element is only one, the term "a" cannot be understood as unique or single, and the term "a" cannot be understood as a limitation on the number.

In the description of the present application, it should be understood that the terms such as "first" and "second" are only for describing, rather than intended to indicate or imply the importance. In the description of the present application, it should be noted that, the terms "connect" and "connection" should be understood in a broad sense, unless there is other definition and limitation. For example, the connection can be a fixed connection, a detachable connection or integrated connection; the connection can be a mechanical connection or an electrical connection; and the connection can be a direct connection or a indirect connection via medium. For those skilled in the art, the detail meanings of the above terms in the present application can be understood according to the specific situations.

In the description of the present application, the reference terms "an embodiment", "some embodiments", "example", "specific example" or "some examples" mean that the specific feature, structure, material or characteristic illustrated in this embodiment or example is included in at least one embodiments or examples of the present application. In the specification of the present application, the exemplary expression of the above terms does not have to refer to the same embodiment or example. In addition, the specific features, structures, materials or characteristics can be combined in a suitable manner in any one or more embodiments or examples. Without contradiction, those skilled in the art can combine different embodiments or examples described in this specification with the features in different embodiments or examples.

At present, the blade of the current hydraulic motor is either a traditional blade that is radially retractable on the rotor, or an integrated penetrating blade that is radially slidable on the rotor. However, the traditional blade has a problem that it cannot be operated in a low rotation speed. The integrated penetrating blade results in a large leakage and abrasion between the blade and the rotor due to the low flatness and deformable capacity. Therefore, the present application provides a split-type blade, to solve the problem that the traditional blade cannot be operated in a low rotation speed, and solve the problem of serious leakage and abrasion between the integrated penetrating blade and the rotor.

Referring to FIGS. 1-9B, a split-type blade in an embodiment of the present application is described. The split-type blade 10 serves as an accessory of a fluid driving device 1 and is mounted in a rotor 20 of the fluid driving device 1, so as to converse the pressure energy of the fluid into the mechanical energy. The split-type blade 10 includes a pushing rod 11 and two valve plates 12. The pushing rod 11 is configured to be slidably disposed in the rotor 20 of the fluid driving device 1 along a radial direction. Two valve plates 12 are respectively mounted on two end portions of the pushing rod 11 in parallel. Each of two valve plates 12 is extended outwards along the pushing rod 11 to form the split-type blade 10 with a penetrating pushing rod structure. When the split-type blade 10 drives the rotor 20 to rotate under the effect of the fluid, the pushing rod 11 of the split-type blade 10 slides along a radial direction of the rotor 20 to ensure an outer edge portion of each valve plate 12 abuts against an inner wall 31 of a stator 30 of the fluid driving device 1 throughout. It should be understood that the fluid adopted in the fluid driving device 1 can be but not limited to liquid water such as extinguishing water, river water or sea water. It can also be implemented as other types of fluids such as solution, air, and so on.

It should be noted that, compared with the traditional blade, the split-type blade 10 in the present application penetrates the rotor 20 through the pushing rod 11, so that the split-type blade 10 can be operated in any rotation speed, which solves the problem that the traditional blade cannot be operated in a low rotation speed. Compared with the integrated penetrating blade, each valve plate 12 of the split-type blade 10 in the present application has a greatly smaller dimension than the integrated penetrating blade. The valve plate 12 has a high flatness even adopts the same sheet material of the integrated penetrating blade, which can reduce the risk of deformation of valve plate 12, facilitating reducing the abrasion between the valve plate 12 of the split-type blade 10 and the rotor 20, so as to improve the service life of the split-type blade 10.

In detail, in the above embodiment of the present application, the pushing rod 11 and the valve plate 12 of the split-type blade 10 are made of different materials. The material strength of the pushing rod 11 is larger than a material strength of the valve plate 12, so that the whole structure of the split-type blade 10 has a sufficient strength. The section area of the pushing rod 11 is greatly smaller than the section area of the valve plate 12, greatly reducing the contacting area between the pushing rod 11 and the rotor 20, further to reduce the abrasion between the pushing rod 11 of the split-type blade 10 and the rotor 20, and improve the service life of the split-type blade 10. It should be understood that the existing integrated penetrating blade is generally made of the plastic sheet material. Therefore, the section area of the connection portion of the integrated penetrating blade cannot be too small, instead, the section area should be as large as possible to ensure a sufficient strength of the integrated penetrating blade, resulting in a larger contacting area between the integrated penetrating blade and the rotor. Which may not only increase the abrasion, but also lead to a serious leakage.

Preferably, the pushing rod 11 of the split-type blade 10 can be made of metal material such as stainless steel, carbon steel or alloy, facilitating the surface precision of the pushing rod 11, which greatly reduces the gap between the pushing rod 11 and the rotor 20, further to reduce the leakage between the split-type blade 10 and the rotor 20. It should be understood that the rotor 20 is generally made of metal material such as stainless steel. The matching degree between the rotor 20 and the pushing rod 11 can be improved by improving the machining accuracy, so as to greatly reduce the gap therebetween and further to reduce the leakage.

It should be noted that the valve plate 12 of the split-type blade 10 can be made of plastic or resin material such as PVDF (Polyvinylidene Difluoride) or PVC (Polyvinyl Chloride), so as to reduce the abrasion and noise when the valve plate 12 slides on the inner wall 31 of the stator 30. Certainly, in other embodiments of the present application, the valve plate 12 of the split-type blade 10 can be made of other nonmetal material, which won't be repeatedly described.

Figure 8:
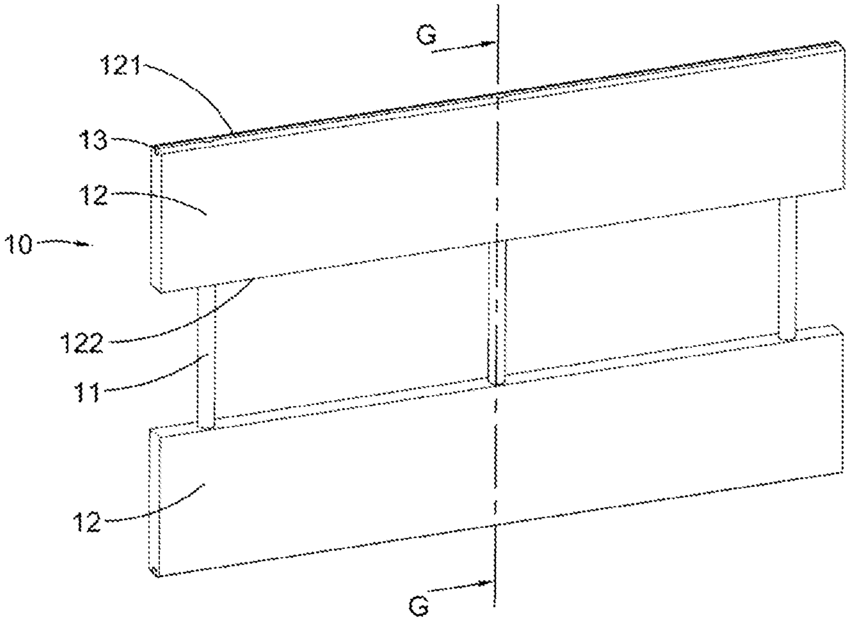
FIG. 8 illustrates a perspective schematic diagram of a split-type blade of a fluid driving device according to an embodiment of the present application.

As an example, according to the above embodiment of the present application and referring to FIG. 8, the split-type blade 10 includes three pushing rods 11 and two valve plates 12. Three pushing rods 11 are equally disposed at an interval. Two end portions 111 of each pushing rod 11 are respectively connected to the inner edge portions 122 of two valve plates 12, to form the split-type blade 10 with split-type pushing rod structure. Two valve plates 12 are supportably connected to each other by three pushing rods 11, so that the whole structure of the split-type blade 10 has a sufficient strength, preventing the split-type blade 10 from deforming, which facilitates improving the quality and the service life of the split-type blade 10.

It should be noted that, the split-type blade 10 in FIGS. 1-8 and the following description takes three pushing rods 11 as an example to explain the characteristics and advantages of the split-type blade 10. Those skilled in the art should understand that specific structure of the split-type blade 10 disclosed in FIGS. 1-8 and the following description is only for illustrations, which is not intended to limit the content and scope of the present application. For example, in other embodiments, the split-type blade 10 can includes one, two or more than three pushing rods 11 according to the different demand.

Figure 9A:
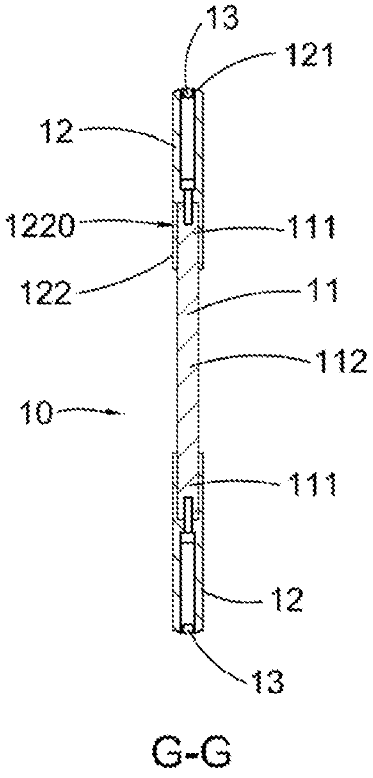
FIGS. 9A and 9B illustrate an exemplary split-type blade according to an embodiment of the present application.
Figure 9B:
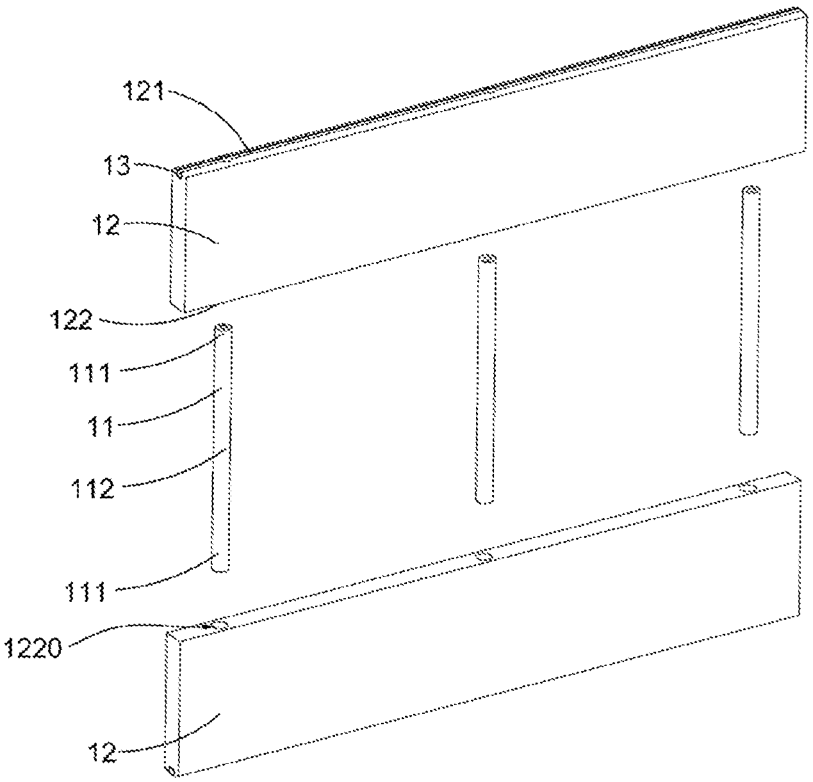

Specifically, in one embodiment of the present application, referring to FIGS. 9A and 9B, the valve plate 12 of the split-type blade 10 can be detachably mounted in the end portion 111 of the pushing rod 11 to facilitate maintaining and replacing the split-type blade 10.

More specifically, referring to FIGS. 9A and 9B, a matching groove 1220 is provided in the inner edge portion 122 of the valve plate 12 of the split-type blade 10. The end portion 111 of the pushing rod 11 can be inserted in the matching groove 1220 of the inner edge portion 122 of the valve plate 12, so as to realize the connection between the valve plate 12 and the pushing rod 11.

Exemplarily, referring to FIG. 9A, the pushing rod 11 of the split-type blade 10 is flexibly connected to the valve plate 12. For example, the pushing rod 11 is connected to the valve plate 12 via a fastening member 151 (such as screw). A screw-matching head is provided in the end portion 111 of the pushing rod 11 of the split-type blade 10, and a screw-matching groove is provided in the inner edge portion 122 of the valve plate 12 of the split-type blade 10. The screw-matching head of the end portion 111 of the pushing rod 11 is inserted in the screw-matching groove of the inner edge portion 122 of the valve plate 12. The valve plate 12 can be flexibly connected to the end portion 111 of the pushing rod 11 via a screw.

It should be noted that the pushing rod 11 is flexibly connected to the valve plate 12 via a spring in another embodiment. specifically, the split-type blade 10 further includes one or more miniature springs. Each of the miniature springs is supported and connected between the pushing rod 11 and the valve plate 12, so as to realize a free retraction fine adjustment of the valve plate 12 by the miniature spring.

Figure 10:
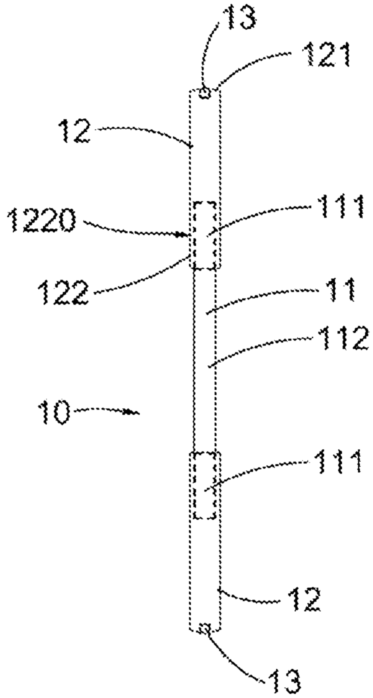
FIG. 10 illustrates a first transformation technical solution of a split-type blade according to an embodiment of the present application.

Certainly, in other embodiments of the present application, the pushing rod 11 of the split-type blade 10 is rigidly connected to the valve plate 12, that is, the pushing rod 11 and the valve plate 12 are in a tight fit (interference fit). For example, referring to FIG. 10, a first transformation technical solution of the split-type blade 10 is described. Specifically, an interference-matching head is provided in the end portion 111 of the pushing rod 11 of the split-type blade 10, and an interference-matching groove is provided in the inner edge portion 122 of the valve plate 12 of the split-type blade 10. The interference-matching head of the end portion 111 of the pushing rod 11 is inserted in the interference-matching groove of the inner edge portion 122 of the valve plate 12, so that the valve plate 12 is rigidly connected to the end portion 111 of the pushing rod 11.

Preferably, referring to FIG. 8 and FIG. 9B, the pushing rod 11 of the split-type blade 10 has a circular section area, so as to maximally reduce the external surface area with the sufficient strength of the pushing rod 11, which maximally reduce the contacting area between the pushing rod 11 and the rotor 20, further to reduce the abrasion and leakage between the pushing rod 11 and the rotor 20. Certainly, in other embodiments of the present application, the pushing rod 11 can also have a section area in a ellipse shape or a oblong shape, which won't be repeatedly described.

Exemplarily, the pushing rod 11 of the split-type blade 10 includes two end portions 111 and a middle portion 112 integrated with two end portion 111. The middle portion 112 has a same circular section with the end portion 111. The middle portion 112 of the pushing rod 11 is extended from one end portion 111 of the pushing rod 11 to another end portion 111 of the pushing rod 11 in a same cross section, so as to form the cylindrical pushing rod 11.

Figure 4A:
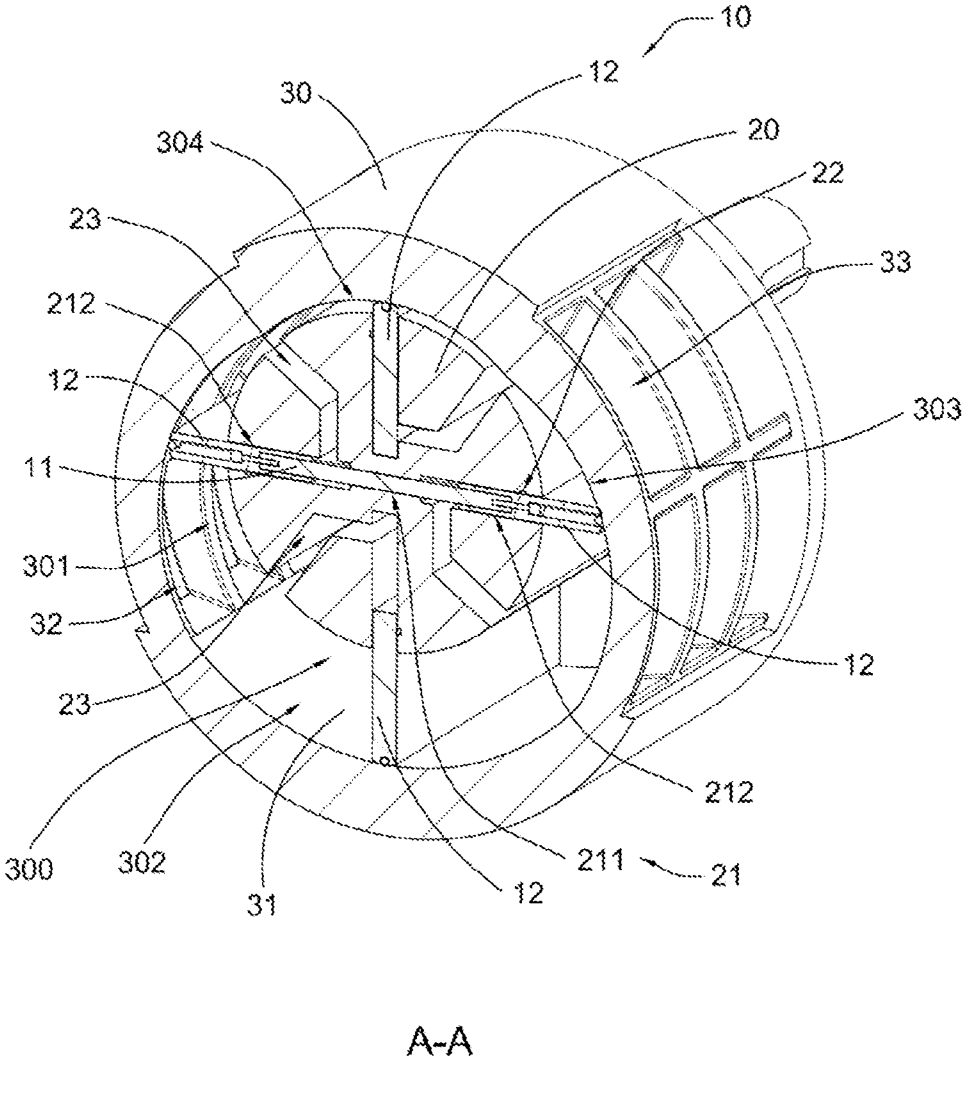
FIGS. 4A-4C respectively illustrate section schematic diagrams of inner components of a fluid driving device according to an embodiment of the present application.
Figure 7:
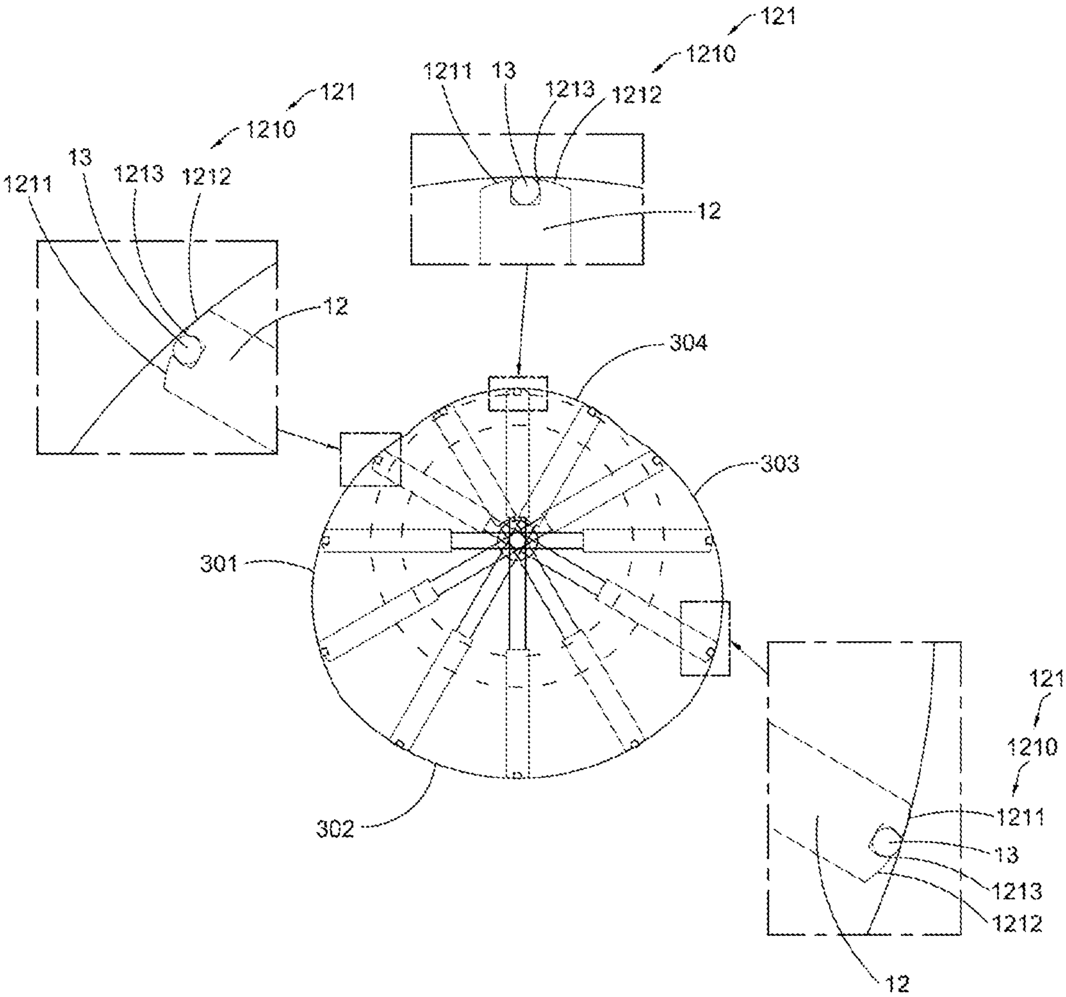
FIG. 7 illustrates a working principle schematic diagram of a fluid driving device according to an embodiment of the present application.

It should be noted that, referring to FIG. 4A and FIG. 7, the stator 30 of the fluid driving device 1 is divided into an inlet area 301, a positive displacement area 302, an outlet area 303 and a negative displacement area 304 along the rotation direction of the rotor 12 (anticlockwise direction in FIG. 7). The envelope curves of the inner wall 31 of the stator 30 in the positive displacement area 302 and the negative displacement area 304 are configured as concentric arc curves. The envelope curve of the inner wall 31 of the stator 30 in the positive displacement area 302 has a larger curvature radius than the envelope curve in the negative displacement area 304. In addition, the envelope curves of the inner wall 31 of the stator 30 are configured as a transmission curve, such as arc curve, Archimedean spiral line, Pascal spiral curve, logarithmic equation curve or other plane curves, so that an inner chamber 300 with a non-circular structure is formed in the stator 30.

Preferably, referring to FIG. 7, the outer edge portion 121 of the valve plate 12 of the split-type blade 10 has an arc end surface 1210. The arc end surface 1210 of the valve plate 12 has an arc structure with hyperbolic radius. When the valve plate 12 of the split-type blade 10 slides in the positive displacement area 302 or the negative displacement area 304 of the inner wall 31 of the stator 30, the arc portion of the arc end surface 1210 of the valve plate 12 with a larger radius abuts against the inner wall 31 of the stator 30. When the valve plate 12 of the split-type blade 10 slides in the inlet area 301 or the outlet area 303 of the inner wall 31 of the stator 30, the arc portion of the arc end surface 1210 of the valve plate 12 with a smaller radius abuts against the inner wall 31 of the stator 30, which facilitates reducing the abrasion between the valve plate 12 of the split-type blade 10 and the stator 30.

Preferably, the arc portion in the arc end surface 1210 of the valve plate 12 of the split-type blade 10 with a larger curvature radius has a same curvature with the envelope curve of the inner wall 31 of the stator 30 in the negative displacement area 304. The valve plate 12 of the split-type blade 10 is in a surface connection with the inner wall 31 of the stator 30 in the negative displacement area 304, so as to better guide the valve plate 12 of the split-type blade 10 to slide along the inner wall 31 of the stator 30, reduce the gap between the valve plate 12 of the split-type blade 10 and the inner wall 31 of the stator 30 in the negative displacement area 304, further to reduce the leakage.

Exemplarily, as shown in FIG. 7, the arc end surface 1210 of the valve plate 12 of the split-type blade 10 includes a front end surface 1211, a rear end surface 1212 and a middle end surface 1213 positioned between the front end surface 1211 and the rear end surface 1212. The front end surface 1211 of the valve plate 12 faces the rotation direction of the rotor 20, and the rear end surface 1212 of the valve plate 12 is back to the rotation direction of the rotor 20. The front end surface 1211 has a same curvature radius with the rear end surface 1212, and has a smaller curvature radius than the middle end surface 1213. The middle end surface 1213 has a same curvature radius with the envelope curve of the inner wall 31 of the stator 30 in the negative displacement area 304. It should be understood that the rotation direction of the rotor 20 in the present application is configured to a direction from the rear end surface 1212 of the valve plate 12 to the front end surface 1211 of the valve plate 12.

When the outer edge portion 121 of the valve plate 12 of the split-type blade 10 is positioned in the inlet area 301 of the stator 30, the rear end surface 1212 of the valve plate 12 abuts against the inner wall 31 of the stator 30. When the outer edge portion 121 of the valve plate 12 of the split-type blade 10 is positioned in the outlet area 303 of the stator 30, the front end surface 1211 of the valve plate 12 abuts against the inner wall 31 of the stator 30. When the outer edge portion 121 of the valve plate 12 of the split-type blade 10 is positioned in the positive displacement area 302 and the negative displacement area 304 of the stator 30, the middle end surface 1213 of the valve plate 12 abuts against the inner wall 31 of the stator 30. The contact position between the valve plate 12 of the split-type blade 10 and the rotor 20 are changed in different areas of the stator 30, which is conductive to reduce the abrasion of the split-type blade 10, improve the service life of the fluid driving device 1. It should be understood that, the front end surface 1211 and the rear end surface 1212 of the valve plate 12 have relatively smaller curvature radius. Therefore, the gap between the valve plate 12 and the inner wall 31 of the stator 30 in the inlet area 301 and the outlet area 303 is relatively large, the contact area is relatively small, greatly reducing the abrasion between the split-type blade 10 and the stator 30. Since the middle end surface 1213 of the valve plate 12 has a relatively large curvature radius, the gap between the valve plate 12 and the inner wall 31 of the stator 30 in the positive displacement area 302 and the negative displacement area 304 is relatively small, and the contact area is relatively large, which is conductive to guide the split-type blade 10 to slide along the inner wall 31 of the stator 30, and to reduce the leakage of the fluid driving device 1.

It should be noted that, in other embodiments of the present application, the arc end surface 1210 of the valve plate 12 of the split-type blade 10 has an arc structure with single curvature radius. The curvature radius of the arc end surface 1210 is preferred to be equal to the curvature radius of the envelope curve of the inner wall 31 of the stator 30 in the negative displacement area 304. That is, the front end surface 1211, the rear end surface 1212 and the middle end surface 1213 of the arc end surface 1210 of the valve plate 12 have the same curvature radius, which is equal to the curvature radius of the envelope curve of the inner wall 31 of the stator 30 in the negative displacement area 304.

In addition, the envelop curves of the stator in the positive displacement area 302 and the negative displacement area 304 are arc curves. The split-type blade 10 doesn't have a swing angle when sliding in the positive displacement area 302 and the negative displacement area 304 of the stator 30, so that the contact position between the split-type blade 10 and the stator 30 in the positive displacement area 302 and the negative displacement area 304 is throughout in the middle end surface 1213 of the valve plate 12 of the split-type blade 10, resulting in a serious abrasion of the middle end surface 1213 of the outer edge portion 121 of the valve plate 12 of the split-type blade 10, causing a leakage of the fluid driving device 1 and a loss of the pressure energy of the fluid.

Therefore, in the above embodiment of the present application, the split-type blade 10 further includes at least two elastic members 13, as shown in FIG. 7 and FIG. 8. Each of the elastic members 13 is correspondingly disposed in the middle end surface 1213 of the outer edge portion 121 of the valve plate 12, so that the elastic member 13 is positioned between the valve plate 12 and the inner wall 31 of the stator 30 when the valve plate 12 of the split-type blade 10 is in the positive displacement area 302 and the negative displacement area 304 of the stator, playing a sealing role. In other words, the elastic member 13 can seal the gap between the split-type blade 10 and the stator 30, preventing the fluid directly flowing from the inlet area 301 of the stator 30 to the outlet area 303 of the stator 30, effectively reducing the leakage and abrasion of the fluid driving device 1, and reducing the loss of the fluid pressure energy as possible. It should be understood that the elastic member 13 can be made of elastic material such as rubber, plastic, polymer material, metal materials and so on, but not limited thereto. The elastic member 13 can be implemented as the elastic member like elastic strip, O-ring, round gasket, arc strip, T-shaped strip, that can have a sealing effect to reduce the leakage, which won't be repeatedly described.

It should be noted that, in the above embodiment of the present application, the inner edge portion 122 of the valve plate 12 is provided with a matching groove 1220 at the connection position to the pushing rod 11, in order to mount the valve plate 12 on the end portion 111 of the pushing rod 11, which facilitates connecting to the end portion 111 of the pushing rod 11 in an inserting manner. However, the existence of the matching groove 1220 will weaken the strength of the connection portion between the inner edge portion 122 of the valve plate 12 and the pushing rod 11, resulting in a deformation or break of the valve plate 12 at this position, further influencing the property and service life of the split-type blade 10. Therefore, the present application can increase the strength of the connection position between the valve plate 12 and the pushing rod 11, so as to improve the whole strength of the split-type blade 10.

Figure 11A:
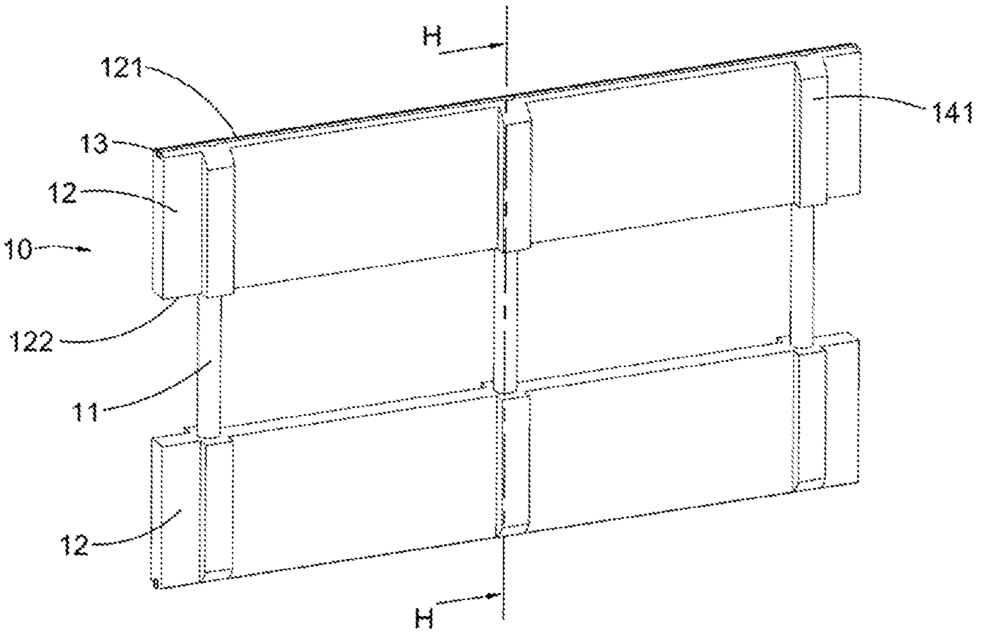
FIGS. 11A and 11B illustrate a second transformation technical solution of a split-type blade according to an embodiment of the present application.
Figure 11B:
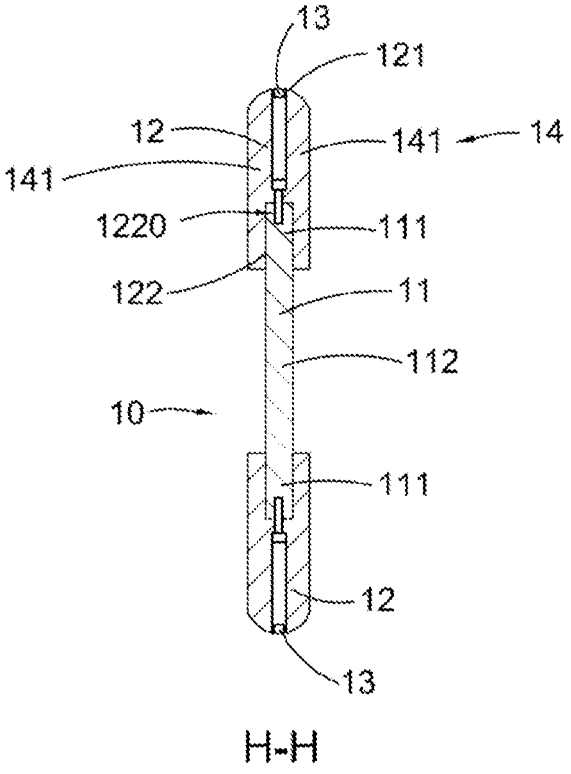

Specifically, as shown in FIG. 11A and FIG. 11B, a second transformation technical solution of the split-type blade 10 according to the above embodiment of the present application is explained. The split-type blade 10 in this transformation solution differs from the above embodiments in that:

the split-type blade 10 further includes one or more reinforcing element 14. The reinforcing element 14 is correspondingly disposed in the connection position between the valve plate 12 and the pushing rod 11, so as to reinforce the connection strength between the valve plate 12 and the pushing rod 11, increasing the whole strength of the split-type blade 10. In other words, the reinforcing element 14 is arranged on the external side of the matching groove 1220 of the valve plate 12, to increase the structural strength of the valve plate 12 at the matching groove 1220.

More specifically, as shown in FIG. 11A and FIG. 11B, the reinforcing element 14 of the split-type blade 10 is configured as two reinforced ribs 141. Two reinforced ribs 141 are symmetrically disposed on the front and rear sides of the matching groove 1220 of the valve plate 12. Each reinforced rib 141 is extended from the inner edge portion 122 of the valve plate 12 to the outer edge portion 121 of the valve plate 12, so as to reinforce the whole strength of the valve plate 12, preventing the valve plate 12 from deforming or breaking.

Preferably, as shown in FIG. 11B, the reinforced rib 141 is integrated and extended outwards from the valve plate 12 to increase the wall thickness of the matching groove 1220, so as to reinforce the strength of the valve plate 12 at the matching groove 1220.

Certainly, in other embodiments of the present application, the reinforcing element 14 of the split-type blade 10 is configured as one reinforced rib 141. The reinforced rib 141 is correspondingly disposed on the front or rear side of the matching groove 1220 of the valve plate 12, having a reinforcing effect on the valve plate 12. However, when the reinforced rib 141 is only provided on one side of the matching groove 1220 of the valve plate 12, the other side of the matching groove 1220 of the valve plate 12 cannot be reinforced, which is easy to break.

Figure 12A:
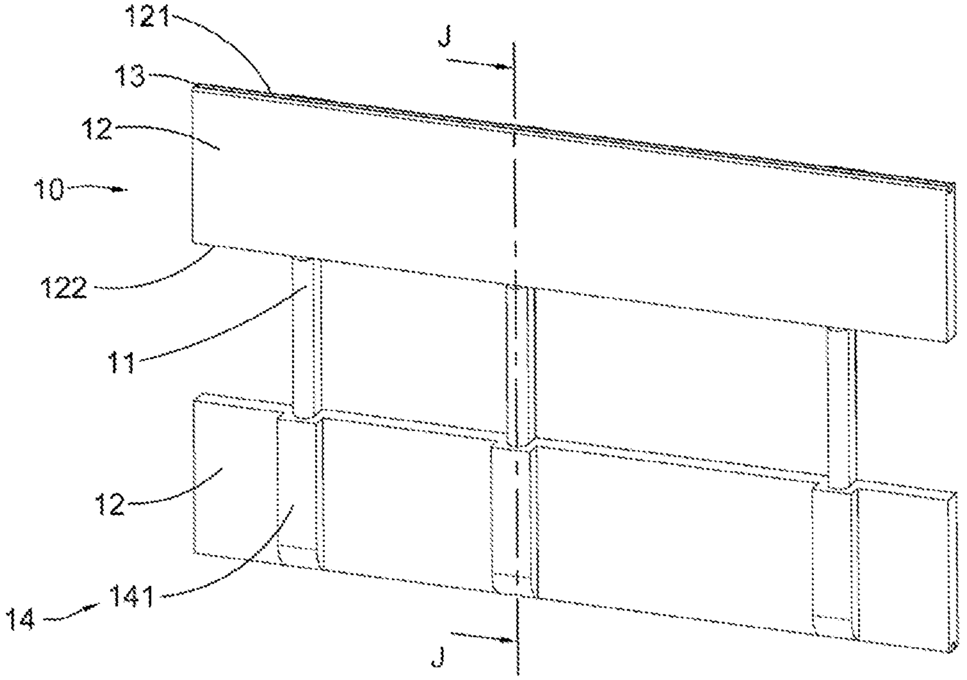
FIGS. 12A and 12B illustrate a third transformation technical solution of a split-type blade according to an embodiment of the present application.
Figure 12B:
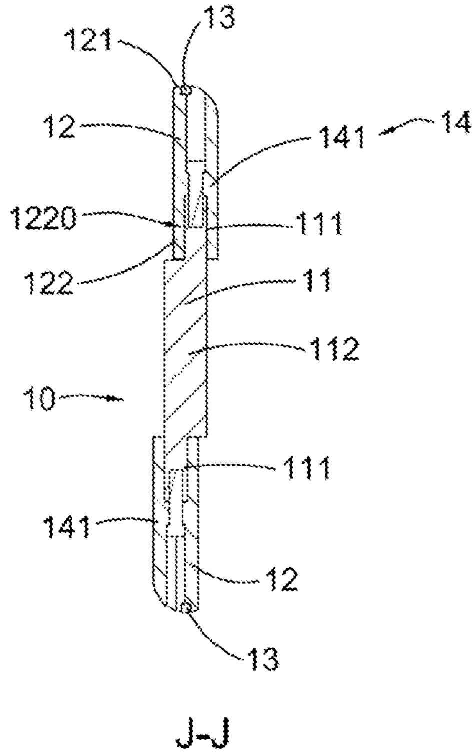
Figure 13:
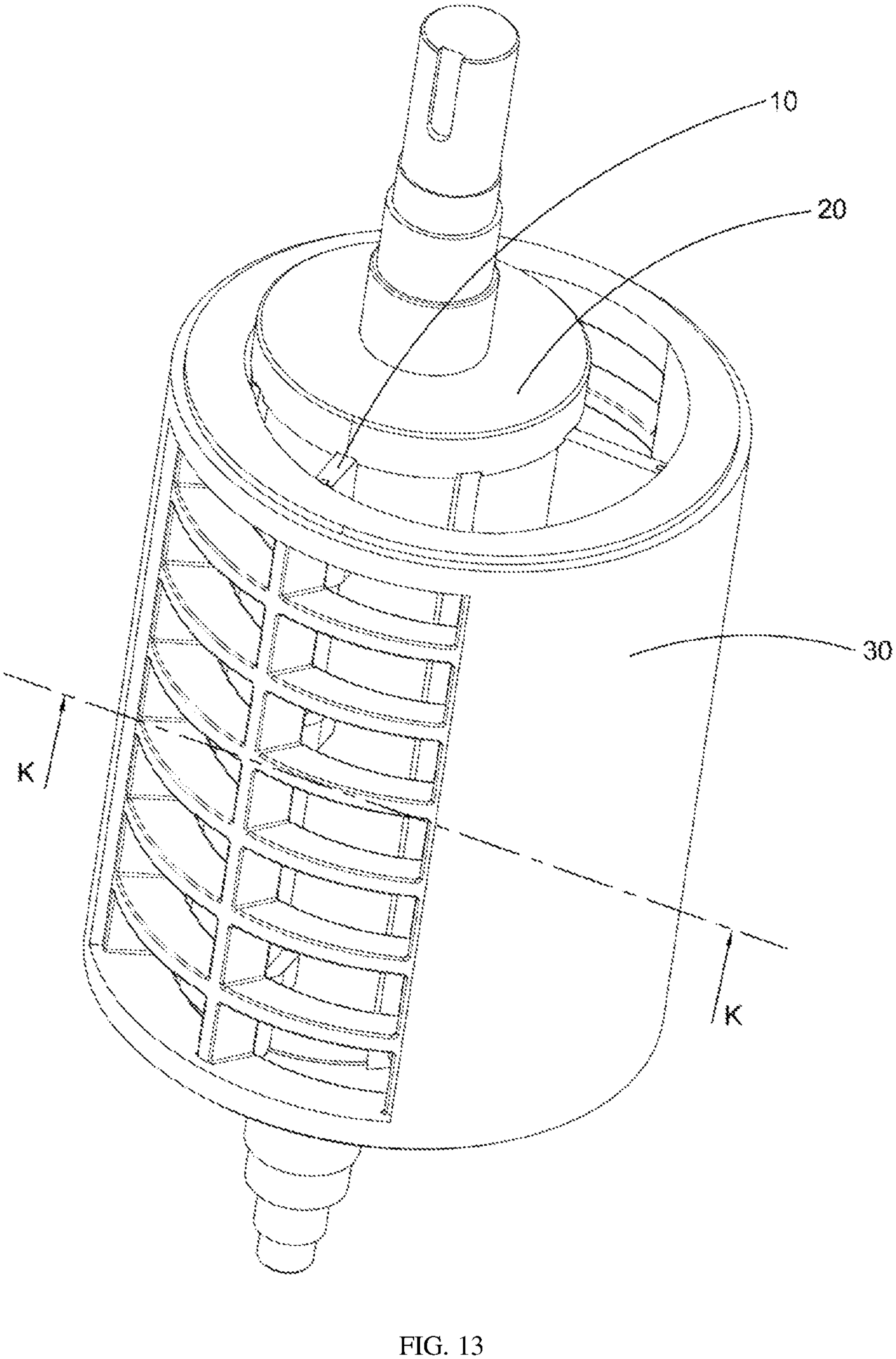
FIGS. 13-16 illustrate application examples of a third transformation technical solution of a split-type blade according to the present application.
Figure 14:
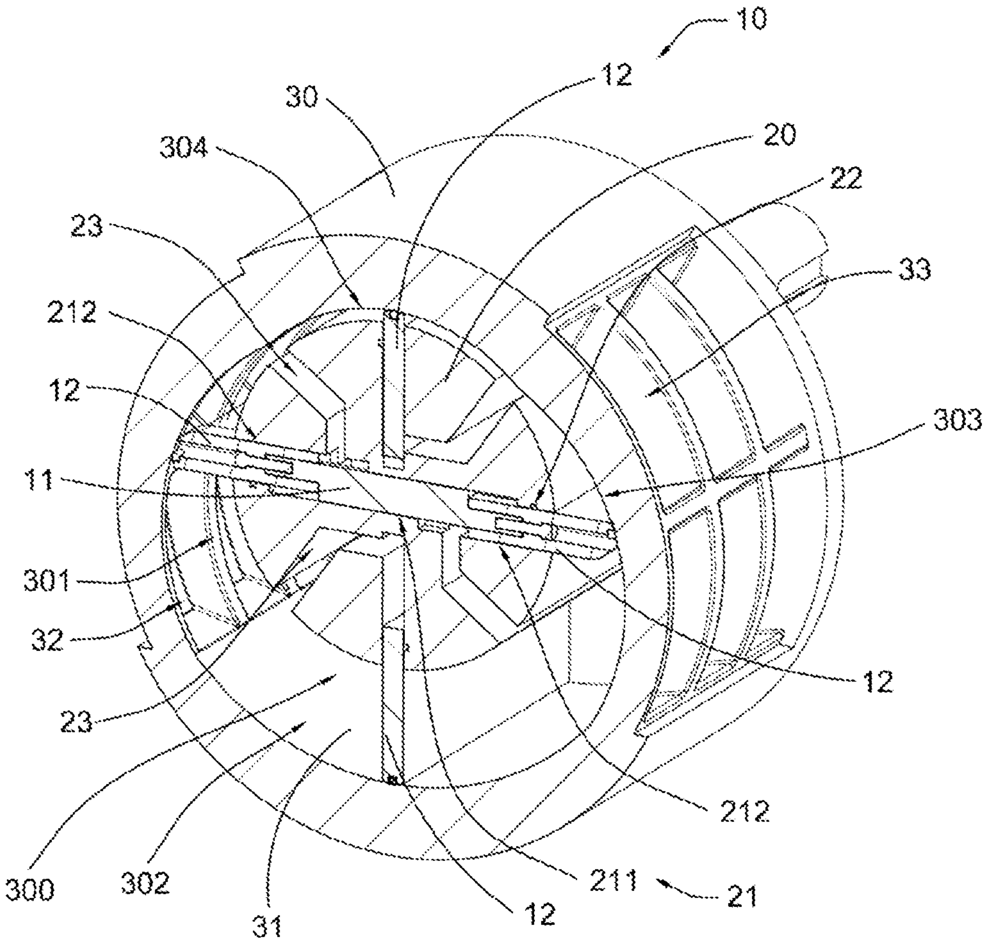

Further, as shown in FIG. 12A and FIG. 12B, a third transformation technical solution of the split-type blade 10 according to the above embodiment of the present application is explained. The split-type blade 10 in this transformation solution differs from the second transformation solution in that: the reinforcing element 14 of the split-type blade 10 is configured as one reinforced rib 141 arranged at the rear side surface of the valve plate 12. The matching groove 1220 of the valve plate 12 is backwards and eccentrically disposed in the inner edge portion 122 of the valve plate 12, so that the matching groove 1220 is positioned at the connection position between the inner edge portion 122 of the valve plate 12 and the reinforced rib 131, increasing the wall thickness of the matching groove 1220, so as to realize the whole reinforcement effect on the valve plate 12 by one reinforced rib 141.

It should be noted that the matching groove of each valve plate 12 is backwards shifted, so that the center point of the matching groove 1220 will deviate from the center axis of the split-type blade 10. Therefore, the end portion 111 of the pushing rod 11 of the split-type blade 10 backwards deviates from the center axis of the split-type blade 10, to align with the matching groove 1220, so that the centerlines of two end portions 111 of the pushing rod 11 are not in the same line.

Preferably, as shown in FIG. 12B, the middle portion 112 of the pushing rod 11 of the split-type blade 10 has a larger section area than the end portion 111 of the pushing rod 11. Two end portions 111 of the pushing rod 11 are respectively extended outwards from two opposite ends of the middle portion 112 along the centerline of the middle portion 112, so that two end portions 111 of the pushing rod 11 are respectively shifted towards the rear side surface of the corresponding valve plates 12. Certainly, in other embodiments of the present application, the middle portion 112 of the pushing rod 11 has the same section area with the end portion 111 of the pushing rod 11. The middle portion 112 of the pushing rod 11 is inclined or bent from one end portion 111 of the pushing rod 11 to the other end portion 111, which won't be repeatedly described.

According to another aspect of the present application, the present application provides a fluid driving device 1, for converting the pressure energy of the fluid into the mechanical energy. In particular, as shown in FIGS. 1-9B, the fluid driving device 1 includes at least one stator 30, at least one rotor 20 and at least two above split-type blades 10. Each rotor 20 is provided with an inner chamber 300*m* and each rotor 20 is rotatably arranged in the inner chamber 300 of the corresponding stator 30. Each split-type blade 10 is slidably mounted in the rotor along the radial direction. The split-type blade 10 includes one or more pushing rods 11 and two valve plates 12. Each pushing rod 11 is configured to slidably penetrate the rotor 20 along the radial direction. Two valve plates 12 are respectively mounted on two end portions 111 of each pushing rod 11 in parallel. Each valve plate 12 is extended outwards along the pushing rod, to form the split-type blade 10 with penetrating pushing rod. When the split-type blade 10 drives the rotor 20 to rotate under the effect of the fluid, each pushing rod 11 of the split-type blade 10 slide along the radial direction of the rotor 20 to ensure an outer edge portion 121 of each valve plate 12 abuts against the inner wall 31 of the stator 30 throughout.

Figure 4B:
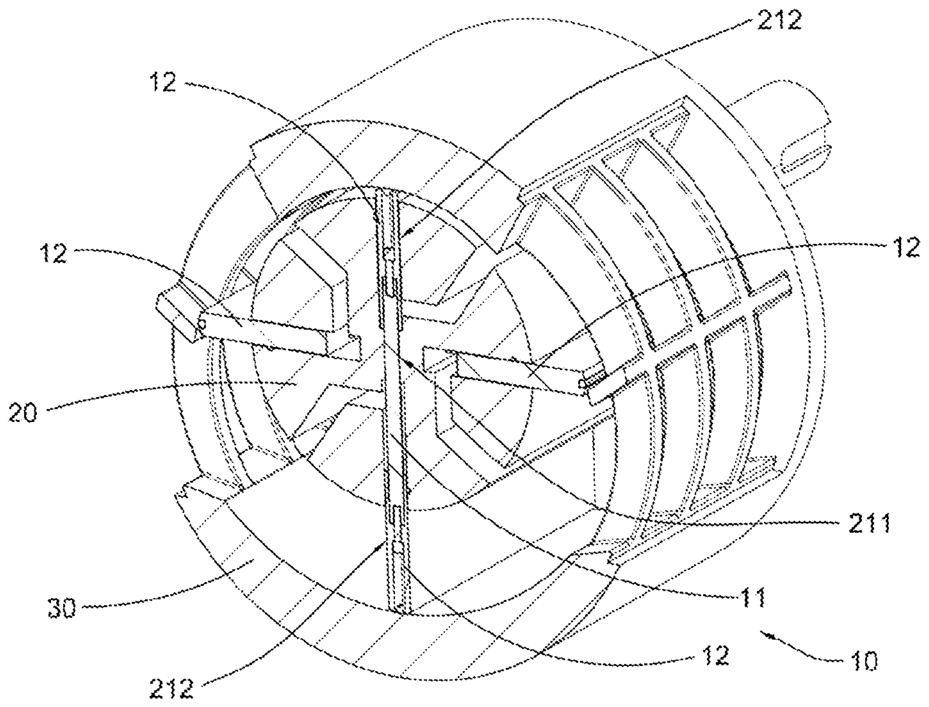
Figure 4C:
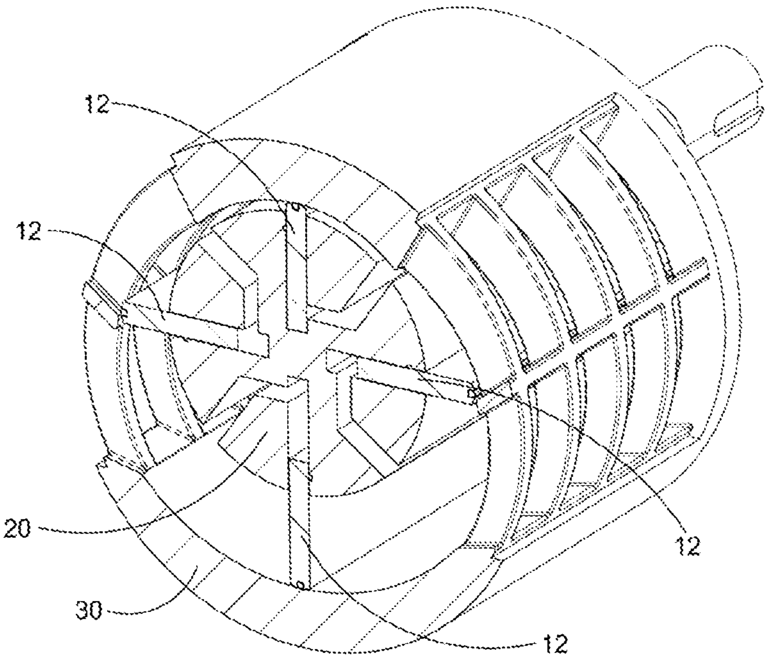
Figure 5:
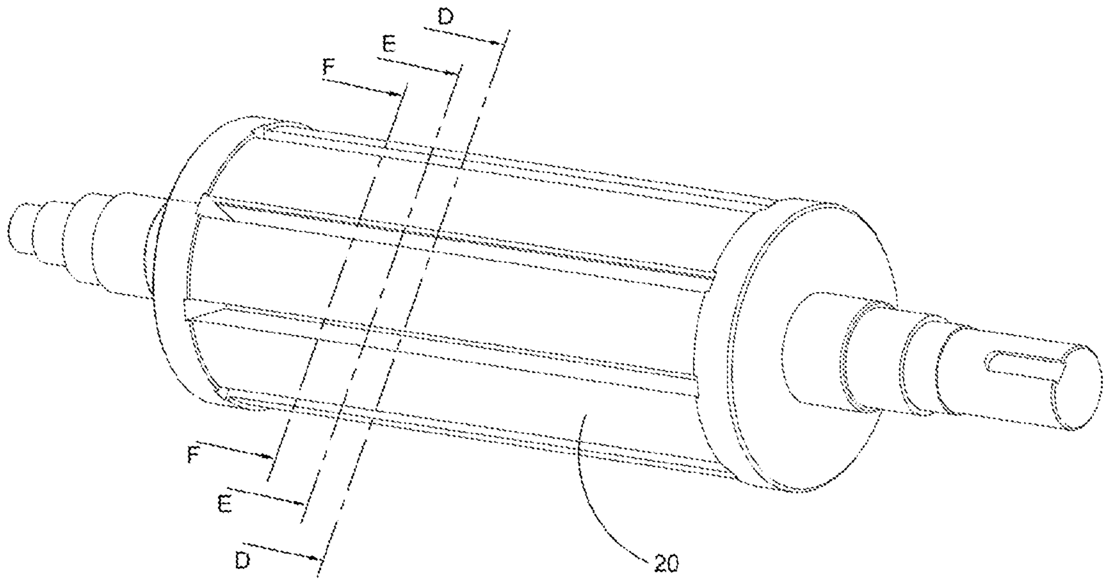
FIG. 5 illustrates a perspective schematic diagram of a rotor in a fluid driving device according to an embodiment of the present application.

More specifically, as shown in FIGS. 4A-4C, the rotor 20 of the fluid driving device 1 is provided with at least two penetrating through holes 21. Each penetrating through hole 21 is extended along the radial direction of the rotor 20 to penetrate the rotor 20, for being slidably mounted in the split-type blade 10, so that the split-type blade 10 can slide in the penetrating through hole 21 in the radial direction, ensuring the sliding of the outer edge portion 121 of the valve plate 12 of the split-type blade 10 on the inner wall 31 of the stator 30. It should be noted that, the at least two penetrating through holes 21 are preferred to be equally spaced in the rotor 20, so that the valve plates 12 of the split-type blade 10 mounted in the penetrating through holes 21 have a same distance therebetween, further to ensure the stable operation of the fluid driving device 1.

Figure 6A:
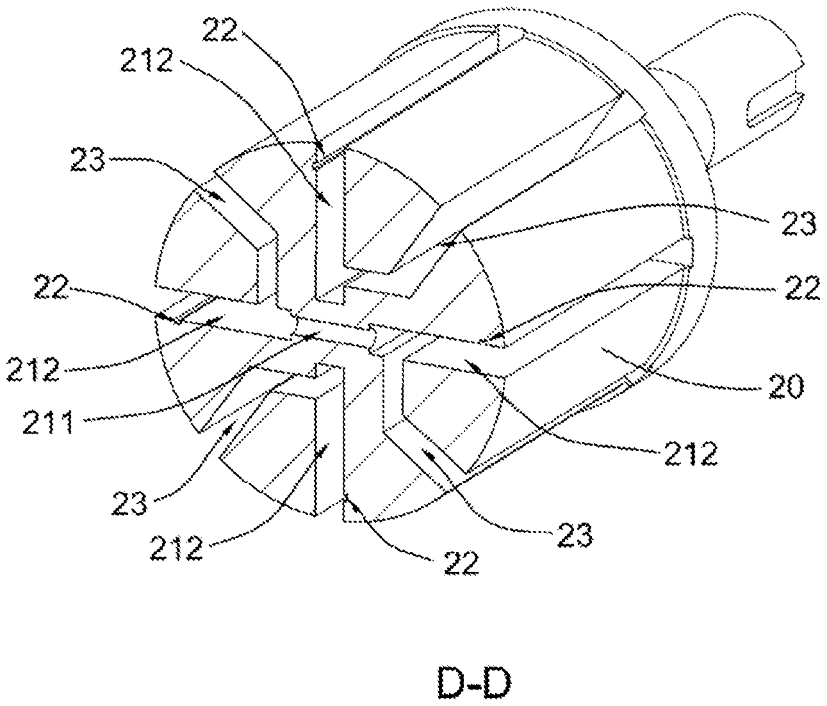
FIGS. 6A-6C respectively illustrate section schematic diagrams of a rotor of a fluid driving device according to an embodiment of the present application.
Figure 6B:
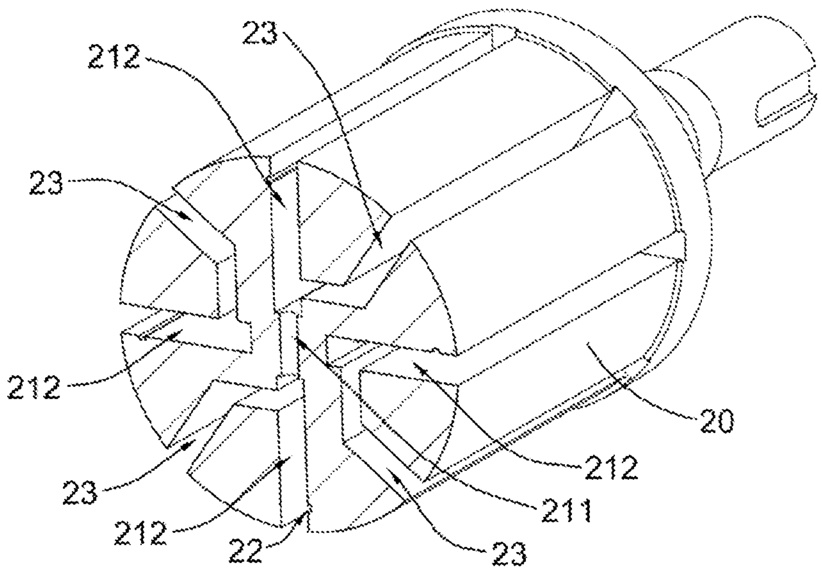
Figure 6C:
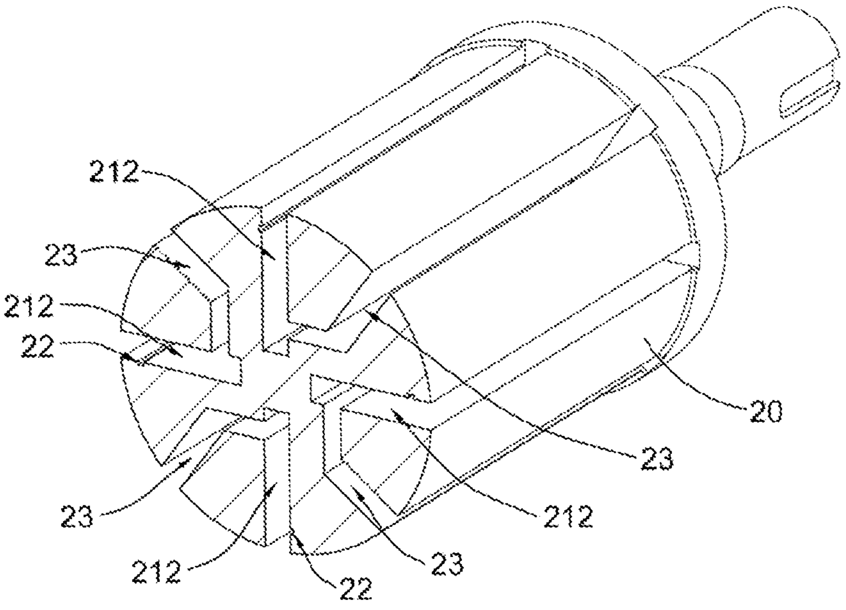

Preferably, as shown in FIGS. 6A-6C, each penetrating through hole 21 of the rotor 20 includes one or more sliding holes 211 and two retracting grooves 212. Two retracting grooves 212 are symmetrically provided on a periphery of the rotor 20. The sliding hole 211 is extended from one retracting groove 212 to another retracting groove 212, to communicate two retracting grooves 212, so as to form the penetrating through hole 21 penetrating the rotor 20. In other words, when the split-type blade 10 is mounted in the penetrating through hole 21 of the rotor 20, the pushing rod 11 of the split-type blade 10 is slidably mounted in the sliding hole 211 of the rotor 20, and the valve plate 12 of the split-type blade 10 is retractably mounted in the retracting groove 212 of the rotor 20, so that the split-type blade 10 can be slidably mounted in the penetrating through hole 21 of the rotor 20. When the rotor 20 rotates relative to the stator 30, the pushing rod 11 of the split-type blade 10 slides in the sliding hole 211 of the rotor 20 along the radial direction. The valve plate 12 of the split-type blade 10 is extended out or retracted in the retracting groove 212, so as to ensuring the sliding of the outer edge portion 121 of the valve plate 12 of the split-type blade 10 on the inner wall 31 of the stator 30.

Further, as shown in FIGS. 4AA-4C, the rotor 20 of the fluid driving device 1 is further provided with two pairs of sealing grooves 22. Two sealing grooves 22 in each pair are respectively disposed on sidewalls (such as front sidewall) of two retracting grooves 212 of the corresponding penetrating through hole 21, which is configured to accommodation the sealing member (not shown in the figures). The sealing member seals the gap between the valve plate 12 of the split-type blade 10 and the rotor 20, to reduce the leakage of the fluid driving device 1.

Furthermore, the rotor 20 of the fluid driving device 1 includes one or more bush (not shown in the figures). The bush is configured to be mounted in the sliding hole 211 of the penetrating through hole 21 of the rotor 20. The bush is arranged around the pushing rod 11 of the split-type blade 10, so as to greatly reduce the gap between the pushing rod 11 and the rotor 20, preventing the fluid from leaking from the gap between the pushing rod 11 of the split-type blade 10 and the rotor 20, minimizing the leakage of the fluid driving device 1.

It should be noted that, the split-type blade 10 slides in the radial direction only in the inlet area 301 and the outlet area 303, while doesn't slide in the radial direction in the positive displacement area 302 and the negative displacement area 304. Therefore, only the split-type blade 10 sliding in the inlet area 301 and the outlet area 303 of the stator 30 will abuts against the rotor 20 to cause the abrasion. In the inlet area 301 and the outlet area 303, the front and rear sides of the valve plate 12 of the split-type blade 10 have a large pressure differential, which may aggravate the abrasion between the split-type blade 10 and the rotor 20.

In order to solve the problem, in the above embodiments of the present application, as shown in FIGS. 4A-6C, the rotor 20 of the fluid driving device 1 is further provided with a plurality of the balance holes 23. Each balance hole 23 is positioned between the adjacent retracting grooves 212, and is communicated with the corresponding retracting groove 212. When the valve plate 12 of the split-type blade 10 slides to the inlet area 301 and the outlet area 303 of the stator 30, the balance hole 23 is configured to introduce fluid in the retracting groove 212 to balance the pressure differential of the valve plate 12 along the radial direction. The pressures on two sides of the split-type blade 10 are in a balance status in the inlet area 301 and the outlet area 303, so as to reduce the abrasion between the split-type blade 10 and the rotor 20.

Exemplarily, as shown in FIGS. 4A-4C, the rotor 20 of the fluid driving device 1 is provided with four balance holes 23. Each balance hole 23 is communicated with a bottom of the retracting groove 212 that positioned in front of the balance hole 23, so that the balance hole 23 introduces the fluid in the rear side of the valve plate 12 of the split-type blade 10 in the retracting groove 212, and fluid pressure is introduced from the front and rear sides of the valve plate 12 of the split-type blade 10, which facilitates balancing the pressure differential between the front and rear sides of the split-type blade 10, reducing the abrasion, and improving the service life of the split-type blade 10 and even the whole fluid driving device 1. Certainly, in other embodiments of the present application, the balance hole 23 can be communicated with the retracting groove 212 at other positions, as long as the communication position is positioned on the inner side of the sealing groove 22 of the retracting groove 212 (i.e., the connection position between the balance hole 23 and the retracting groove 212 is closer to the center axis of the rotor 20 than the sealing groove 22), so as to ensure pressure differential balance on front and rear sides of the valve plate 12 of the split-type blade 10 under the sealing effect of the sealing groove 22, which won't be repeatedly described.

Figure 2:
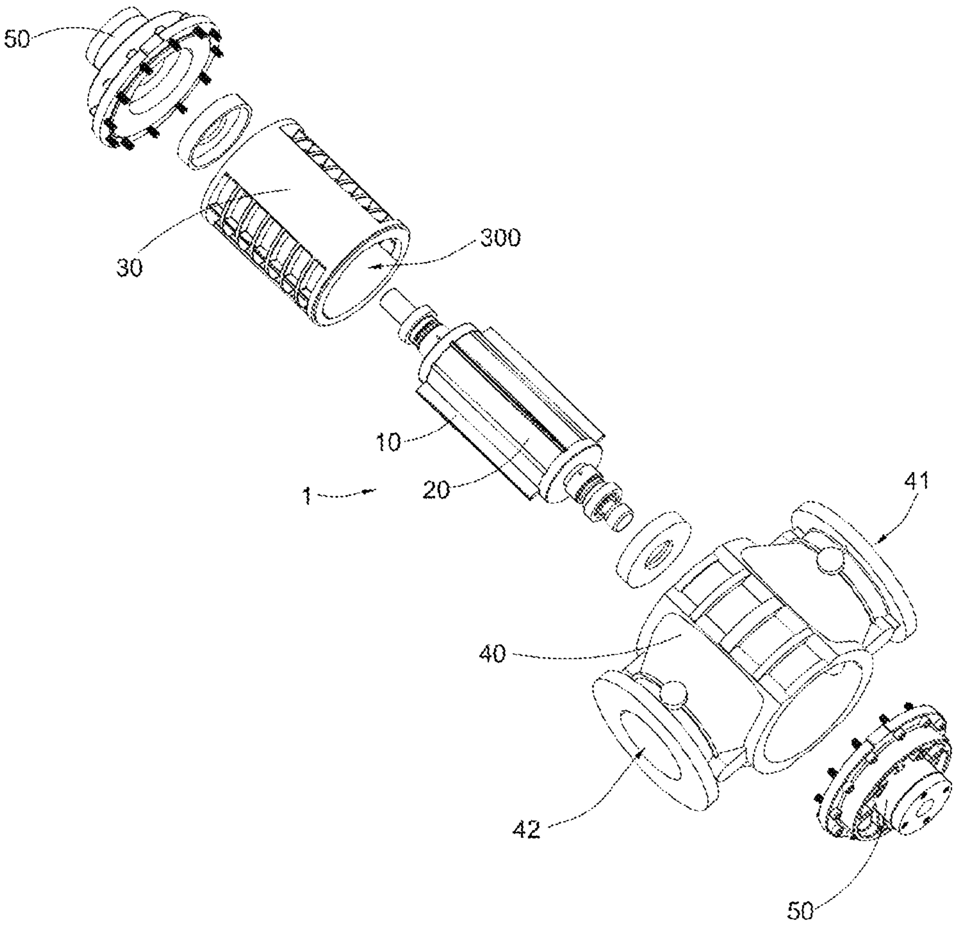
FIG. 2 illustrates an explosion schematic diagram of a fluid driving device according to an embodiment of the present application.
Figure 3:
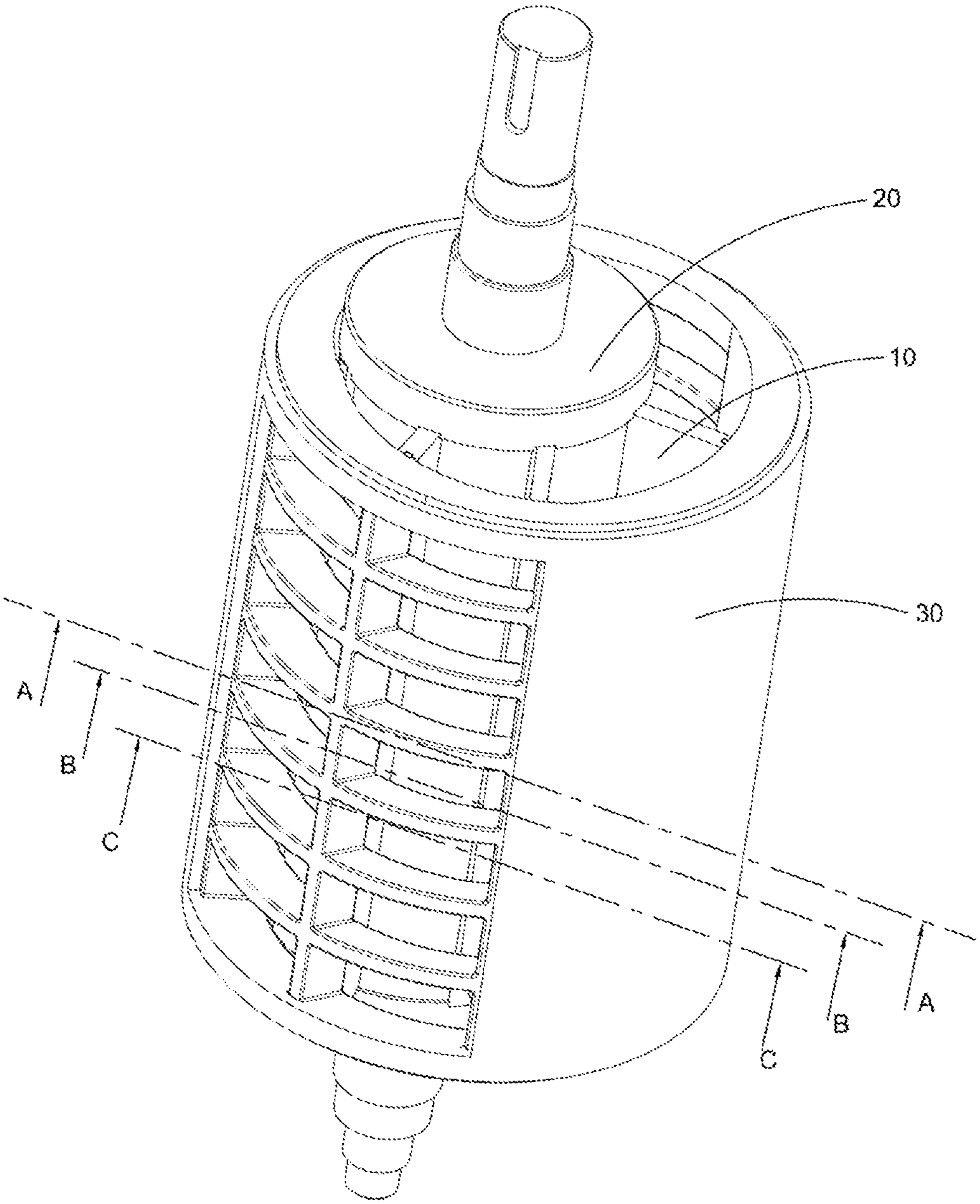
FIG. 3 illustrates a perspective schematic diagram of inner components of a fluid driving device according to an embodiment of the present application.

According to the above embodiments of the present application, as shown in FIG. 1 and FIG. 2, the fluid driving device 1 further includes a housing 40 and two end plates 50. The housing 40 is provided with an inlet tube 41 for introducing the fluid and an outlet tube 42 for discharging the fluid. The stator 30 is fixedly arranged in the housing 40. The rotor 20 is rotatably mounted in the housing 40 via the end plate 50. The inlet tube 41 of the housing 40 is corresponding to the inlet 32 of the stator 30 and the outlet tube 42 is corresponding to the outlet 33 of the stator, so that the fluid flows from the inlet tube 41 of the housing 40 in the inner chamber 300 of the stator through the inlet 32 of the stator 30, and further flows out of the outlet tube 42 of the housing 40 through the outlet 33 of the stator 30. At the same time, the fluid drives the split-type blade to rotate, further drives the rotor 20 to rotate, so as to partly converse the pressure energy of the fluid into the mechanical energy. The rotor 20 can further drive the devices such as the plunger pump, and fan, to rotate, to realize the corresponding effect.

Preferably, the inlet 32 of the stator in the present application can be configured as grille openings. The grille openings are configured to be evenly distributed in the inlet area 301 of the stator 30, so that the fluid from the inlet 32 of the stator 30 can flow to two sides of the valve plate 12 of the split-type blade 10 in the inlet area 301 at the same time. The pressures of two sides of the split-type blade 10 are further balanced in the inlet area 301 of the stator 30, maximally reducing the abrasion between the split-type blade 10 and the rotor 20. Certainly, the outlet 33 of the stator 30 in the present application can also be configured as the grille openings that are evenly distributed in the outlet area 303 of the stator 30.

Figure 15:
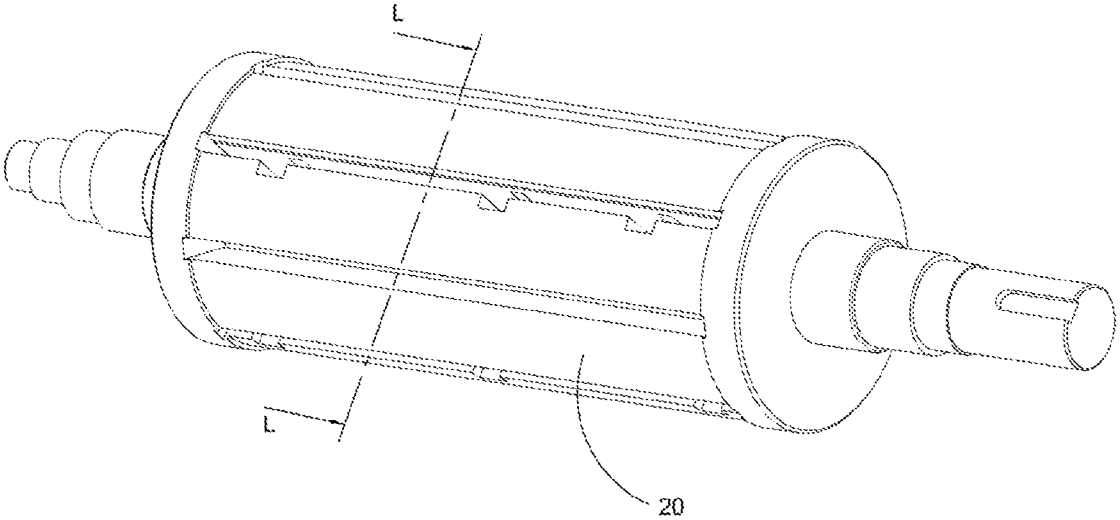
Figure 16:
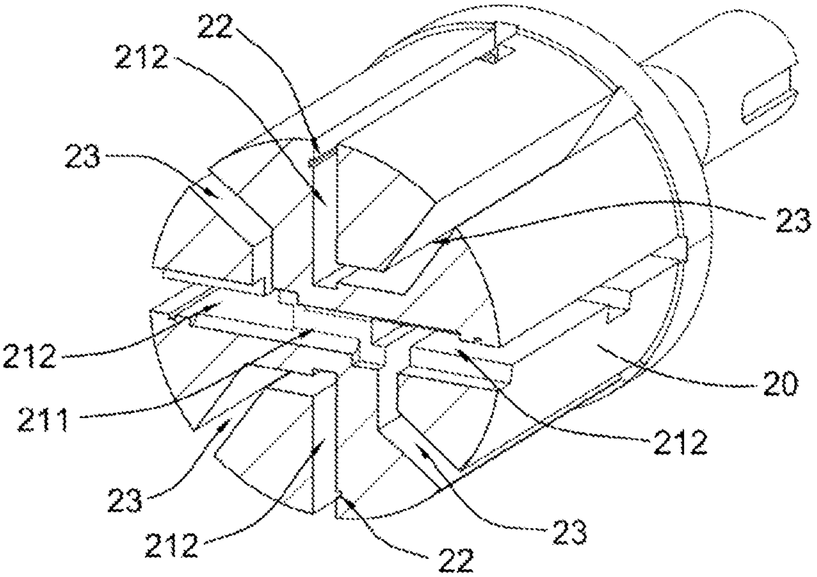

It should be noted that, in the above third transformation solution of the present application, the split-type blade 10 is provided with a reinforced rib 141 at the rear side surface of the valve plate 12. The reinforced rib 141 of the split-type blade 10 adopts an eccentric structure design. Therefore, the split-type blade 10 can slide in the radial direction relative to the rotor 20. The penetrating through hole 21 of the rotor 20 of the fluid driving device 1 is matched with the structure of the split-type blade 10. For example, the penetrating through hole 21 can be further includes an eccentric groove 213 corresponding to the reinforced rib 141. The eccentric groove 213 is extended backwards from the retracting groove 212, which is configured to slidably accommodate the reinforced rib 141, which is shown in FIG. 15 and FIG. 16 in detail, which won't be repeatedly described.

In the above second transformation solution of the present application, the reinforced rib 141 of the split-type blade 10 adopts a concentric structure design. Two reinforced ribs 141 of each pair are symmetrically disposed on front and rear sides of the valve plate 12. Therefore, the penetrating through hole 21 can further include a concentric groove corresponding to each pair of the reinforced ribs 141. The concentric groove is extended frontwards and backwards from the retracting groove 212 at the same time, which is configured to slidably accommodate the reinforced rib 141.

Figure 17:
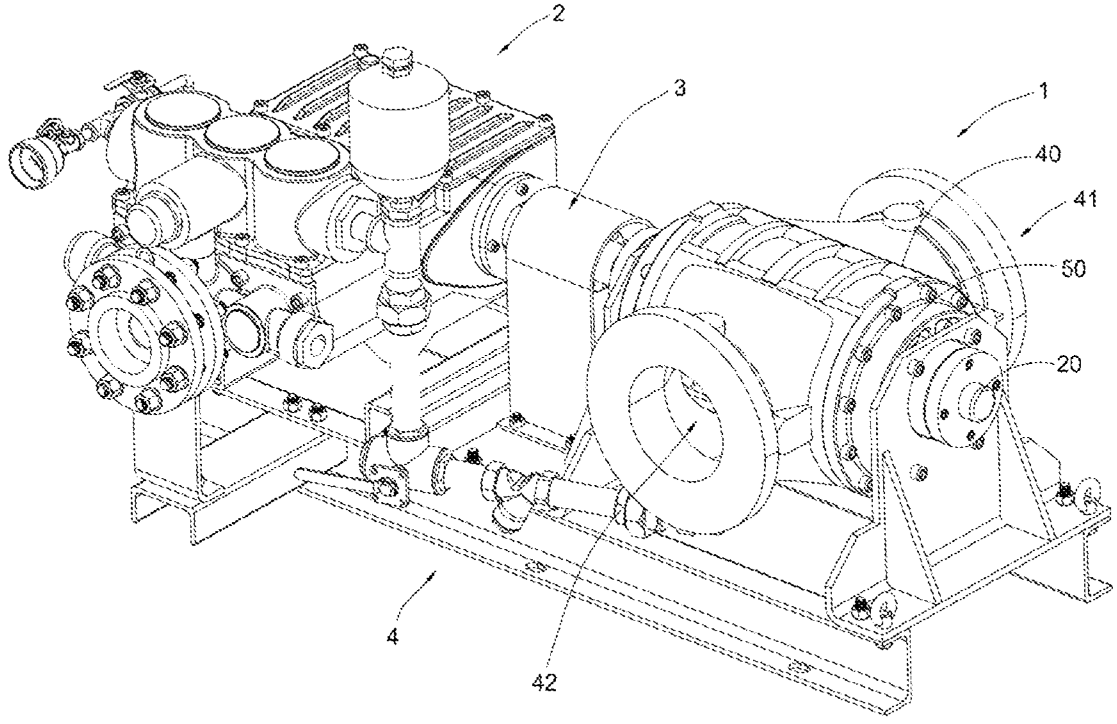
FIG. 17 illustrates a structural schematic diagram of a fluid driving proportional mixer according to an embodiment of the present application.

According to another aspect of the present application, the present application provides a fluid driving proportional mixer for mixing a first fluid and a second fluid in a predetermined ratio. In particular, as shown in FIG. 17, the fluid driving proportional mixer includes a fluid driving device 1, a pump device 2 and a coupling 3. The coupling 3 is configure to connect the fluid driving device 1 to the pump device 2. When the first fluid (such as extinguishing water) flows in the fluid driving device 1, the fluid driving device 1 is firstly partly converser the pressure energy of the first fluid into the mechanical energy, and outputs the first fluid. Afterwards, the coupling 3 transmits the mechanical energy conversed by the fluid driving device 1 to the pump device 2. Finally, the pump device 2 converses the mechanical energy transmitted by the coupling 3 into the pressure energy of the second fluid (such as foam liquid), and outputs the second fluid, so that the first fluid and the second fluid can mixed in the predetermined ratio. It should be understood that, the predetermined ration mentioned in the present application can be but not limited to a ratio scope such as 1%, 3% or 6%. For example, when the predetermined ratio is configured as a ration scope of 3%, the predetermined ratio can be within the range of 3%-9%.

Preferably, the pump device 2 can be configured as but not limited to a reciprocating piston pump. The reciprocating piston pump can be reciprocated in the fluid driving device 1 driven by the coupling 3, so as to suck the second fluid and introduce the second fluid in the first fluid, so as to realize the mixture of the first fluid and the second fluid. It should be understood that the pump device 2 can also be configured as other types of pumps such as centrifugal pump, axial flow pump, partial flow pump or vortex pump.

According to the above embodiments of the present application, as shown in FIG. 17, the fluid driving proportional mixer further includes a piping device 4. The piping device 4 includes a mixing pipe and a cleaning pipe. The mixing pipe communicates the outlet of the reciprocating piston pump with the outlet of the fluid driving device 1, which is configured to transmit the second fluid transmitted by the reciprocating piston pump to the outlet of the fluid driving device 1 through the mixing pipe. The second fluid transmitted by the reciprocating piston pump can be mixed with the first fluid transmitted by the fluid driving device 1 in a ratio. The cleaning pipe communicates the inlet of the reciprocating piston pump with the inlet of the fluid driving device 1, which is configured to transmit the first fluid from the inlet of the fluid driving device 1 to the inlet of the reciprocating piston pump, so that the reciprocating piston pump and the mixing pipe can be cleaned by the first fluid before or after the mixing.

It should be understood that, the mixing pipe and/or the cleaning pipe can be provided with various pipe auxiliary elements that meet the cleaning requirements such as manual ball valve, check valve, exhaust valve, pressure gauge, or instrument valve, which are not limited thereto. It won't be repeatedly described in the present application.

In summary, the fluid driving proportional mixer in the present application enjoys the following advantages:

1) a hydraulic driving without leakage and additional power, in which the present application adopts the extinguishing water for a direct drive, additional power like electric motor or diesel engine is not required, and there is no water leakage, which is different from the pelton turbine, so that a specific water discharging groove is not required, the proportional mixer can be in operate when the extinguishing pump operates normally, greatly increasing the reliability of the whole system;
2) a positive pressure injection without back pressure requirement, in which the piston pump can compress the foam liquid, so that the pressure of the injection point is a little bit higher than the water pressure, so that there is no back pressure requirement in this pressure range, which is suitable for any system and realizes a remote injection;
3) a strong liquid absorption capacity, so as to adapt to any extinguishing agent, in which the piston pump has a super strong self-absorption capacity, which can not only be applied to all foam extinguishing agent with high viscosity, solubility resistance and fluorine free, but also be applied to all water-based extinguishing agent, detergent and other various agents like wetting agent, in which the maximal viscosity can reach 1000 cps;
4) a wide flow rate range, which is not influenced by the water pressure and back pressure, in which the fluid driving device 1 in the present application and the reciprocating piston pump adopt the volumetric type, so that the proportional mixer can be in operate in a certain working pressure range, having a relatively wide flow rate range and won't be influenced by the water pressure and back pressure;
5) flexible installation position without the requirement of direct pipe, in which the system can be directly mounted in the main water supply circuit with a plurality of mounting directions, so that the installation of the proportional mixer is more flexible and the outlet of the system is not required be configured as a direct pipe section; and
6) a rapid response speed, in which the reciprocating piston pump can be driven and mix the foam liquid and the water by sucking immediately when the water flows through the fluid driving device 1, realizing a real-time accurate mixing ratio.

Those skilled in the art should understand that, the above embodiment of the present application described above and shown in the figures are the exemplary embodiments, which are not intended to limit the present application. The purpose of the present application has already been to completely and effectively realized. The functions and structural principles of the present application have already been illustrated and explained in the embodiments. The implementation manner can be changed or modified without departing from the principle.

What is claimed is:

1. A split-type blade for serving as an accessory of a fluid driving device and converting a pressure energy of a fluid into a mechanical energy, comprising:

a plurality of pushing rods, wherein the plurality of pushing rods are configured to be slidably disposed in a rotor of the fluid driving device along a radial direction; and two valve plates, wherein the two valve plates are respectively mounted on two end portions of the pushing rod in parallel, each of the two valve plates extends outwards along the pushing rod to form a split-type blade with a penetrating pushing rod structure, so that when the split-type blade drives the rotor to rotate under an effect of the fluid, each pushing rod of the split-type blade is slid along the radial direction of the rotor to ensure outer edge portions of the two valve plates abuts against an inner wall of a stator of the fluid driving device all long the inner wall of the stator;

wherein the plurality of the pushing rods are evenly spaced, and two end portions of each of the plurality of pushing rods are respectively connected to inner edge portions of the two valve plates;

wherein each of the two valve plates is provided with a matching groove in the inner edge portion, and each of the two end portions of each of the plurality of pushing rods is inserted in the matching groove of the two valve plates to rigidly or flexibly connect each of the plurality of pushing rods to the two valve plates;

a reinforcing element, wherein the reinforcing element is correspondingly disposed on the two valve plates at a connection portion with the plurality of the pushing rods to reinforce a connection strength between the two valve plates and the plurality of the pushing rods;

wherein the reinforcing element adopts two reinforced ribs that are symmetrically disposed at a front side and a rear side of the matching groove of the two valve plates, and each of the two reinforced ribs extends from the inner edge portions of the two valve plates to the outer edge portions of the two valve plates.

2. A split-type blade for serving as an accessory of a fluid driving device and converting a pressure energy of a fluid into a mechanical energy, comprising:

a plurality of pushing rods, wherein the plurality of pushing rods are configured to be slidably disposed in a rotor of the fluid driving device along a radial direction; and two valve plates, wherein the two valve plates are respectively mounted on two end portions of the pushing rod in parallel, each of the two valve plates extends outwards along the pushing rod to form a split-type blade with a penetrating pushing rod structure, so that when the split-type blade drives the rotor to rotate under an effect of the fluid, each pushing rod of the split-type blade is slid along the radial direction of the rotor to ensure outer edge portions of the two valve plates abuts against an inner wall of a stator of the fluid driving device all long the inner wall of the stator;

wherein the plurality of the pushing rods are evenly spaced, and two end portions of each of the plurality of pushing rods are respectively connected to inner edge portions of the two valve plates;

wherein each of the two valve plates is provided with a matching groove in the inner edge portion, and each of the two end portions of each of the plurality of pushing rods is inserted in the matching groove of the two valve plates to rigidly or flexibly connect each of the plurality of pushing rods to the two valve plates;

a reinforcing element, wherein the reinforcing element is correspondingly disposed on the two valve plates at a connection portion with the plurality of the pushing rods to reinforce a connection strength between the two valve plates and the plurality of the pushing rods;

wherein the reinforcing element adopts a reinforced rib that is correspondingly disposed at a rear side of the matching groove of the two valve plates, and the reinforced rib extends from the inner edge portions of the two valve plates to the outer edge portions of the two valve plates.

3. The split-type blade according to claim 2, wherein the matching groove of the two valve plates is backwards and eccentrically disposed at the inner edge portions of the two valve plates, so that the matching groove is positioned at a connection portion between the inner edge portions of the two valve plates and the reinforced rib.

4. The split-type blade according to claim 3, wherein a section area of a middle portion of each of the plurality of the pushing rods is larger than a section area of the two end portions of each of the plurality of the pushing rods, and the two end portions of each of the plurality of the pushing rods are integrated and respectively extend outwards from two ends of the middle portion of each of the plurality of the pushing rods along a direction parallel to a center axis of the middle portion.

5. A fluid driving device for partly converting a pressure energy of a fluid into a mechanical energy, comprising:

at least one stator, wherein an inner chamber is provided in the at least one stator;

at least one rotor, wherein the at least one rotor is rotatably provided in the corresponding inner chamber of the at least one stator; and at least two split-type blades, wherein the at least two split-type blades slidable in a radial direction are mounted in a corresponding one of the at least one rotor; and each of the at least two split-type blades comprises:

a pushing rod, wherein the pushing rod is configured to be slidably disposed in the corresponding one of the at least one rotor of the fluid driving device along the radial direction; and two valve plates, wherein the two valve plates are respectively mounted on two end portions of the pushing rod in parallel, each of the two valve plates extends outwards along the pushing rod to form a split-type blade of the at least two split-type blades with a penetrating pushing rod structure, so that when the split-type blade drives the corresponding one of the at least one rotor to rotate under an effect of the fluid, the pushing rod of the at least two split-type blades is slid in the radial direction of the at least one rotor to ensure an outer edge portion of each of the two valve plates abuts against an inner wall of a corresponding one of the at least one stator of the fluid driving device all long the inner wall of the corresponding one of the at least one stator;

wherein the at least one rotor is provided with at least two penetrating through holes, wherein each of the at least two penetrating through holes extends along the radial direction of the at least one rotor to penetrate the at least one rotor for being slidably mounted in the split-type blade;

wherein each of the at least two penetrating through holes of the at least one rotor comprises a sliding hole and two retracting grooves, wherein the two retracting grooves are symmetrically provided on a periphery of the at least one rotor, the sliding hole extends from one retracting groove of the two retracting grooves to a second of the two retracting grooves, the pushing rod of the split-type blade is slidably mounted in the sliding hole of the at least one rotor, and each of the two valve plates is retractable mounted in the two retracting grooves of the at least one rotor.

6. The fluid driving device according to claim 5, wherein the at least one rotor is further provided with at least two pairs of sealing grooves, two sealing grooves in each pair of the at least two pairs of sealing grooves are respectively disposed on sidewalls of the two retracting grooves of the at least two penetrating through holes of the at least one rotor, the two sealing grooves are configured to accommodate a sealing member to seal a gap between the two valve plates and the at least one rotor by the sealing member.

7. A fluid driving device for partly converting a pressure energy of a fluid into a mechanical energy, comprising:

at least one stator, wherein an inner chamber is provided in the at least one stator;

at least one rotor, wherein the at least one rotor is rotatably provided in the corresponding inner chamber of the at least one stator; and at least two split-type blades, wherein the at least two split-type blades slidable in a radial direction are mounted in a corresponding one of the at least one rotor; and each of the at least two split-type blades comprises:

a pushing rod, wherein the pushing rod is configured to be slidably disposed in the corresponding one of the at least one rotor of the fluid driving device along the radial direction; and two valve plates, wherein the two valve plates are respectively mounted on two end portions of the pushing rod in parallel, each of the two valve plates extends outwards along the pushing rod to form a split-type blade of the at least two split-type blades with a penetrating pushing rod structure, so that when the split-type blade drives the corresponding one of the at least one rotor to rotate under an effect of the fluid, the pushing rod of the at least two split-type blades is slid in the radial direction of the at least one rotor to ensure an outer edge portion of each of the two valve plates abuts against an inner wall of a corresponding one of the at least one stator of the fluid driving device all long the inner wall of the corresponding one of the at least one stator;

wherein the at least one rotor is provided with a plurality of balance holes, each of the plurality of balance holes is positioned in the at least one rotor and is in communication with a bottom of a corresponding retracting groove, when at least one of the two valve plates of the split-type blade is slid to an inlet area and an outlet area of the at least one stator, the balance hole corresponding to the at least one of the two valve plates is configured to introduce the fluid in a retracting grooves to balance a pressure differential of the two valve plates along the radial direction.

* * * * *